(12) United States Patent
Yoo et al.

(10) Patent No.: US 10,185,684 B2
(45) Date of Patent: Jan. 22, 2019

(54) SYSTEM INTERCONNECT AND OPERATING METHOD OF SYSTEM INTERCONNECT

(71) Applicant: SAMSUNG ELECTRONICS CO., LTD., Suwon-si (KR)

(72) Inventors: Jun Hee Yoo, Ansan-si (KR); Jaegeun Yun, Hwaseong-si (KR); Bub-chul Jeong, Yongin-si (KR); Dongsoo Kang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 14/616,845

(22) Filed: Feb. 9, 2015

(65) Prior Publication Data
US 2015/0227481 A1  Aug. 13, 2015

(30) Foreign Application Priority Data

Feb. 7, 2014 (KR) .................. 10-2014-0014260

(51) Int. Cl.
*G06F 13/364* (2006.01)
*G06F 13/16* (2006.01)
*G06F 13/42* (2006.01)
*G06F 21/42* (2013.01)

(52) U.S. Cl.
CPC ........ *G06F 13/364* (2013.01); *G06F 13/1673* (2013.01); *G06F 13/4217* (2013.01); *G06F 21/42* (2013.01); *G06F 2221/2101* (2013.01)

(58) Field of Classification Search
None
See application file for complete search history.

(56) References Cited

U.S. PATENT DOCUMENTS

| | | | |
|---|---|---|---|
| 6,948,017 B2 | 9/2005 | Carpenter et al. | |
| 7,036,038 B2 | 4/2006 | Urzi et al. | |
| 7,219,177 B2 | 5/2007 | Chang et al. | |
| 7,239,669 B2 | 7/2007 | Cummings et al. | |
| 7,370,133 B2* | 5/2008 | Iyer | G06F 13/1689 710/22 |
| 7,865,644 B2 | 1/2011 | Drerup et al. | |
| 8,107,492 B2* | 1/2012 | Hofmann | G06F 13/42 370/431 |
| 8,352,774 B2 | 1/2013 | Elrabaa | |
| 8,370,551 B2 | 2/2013 | Ohmacht et al. | |
| 8,370,554 B2* | 2/2013 | Kobayashi | H04N 21/43632 348/469 |
| 8,443,122 B2 | 5/2013 | Yun et al. | |
| 8,468,285 B2* | 6/2013 | Kobayashi | G06F 13/4081 710/17 |
| 8,582,709 B2 | 11/2013 | Yun et al. | |

(Continued)

*Primary Examiner* — Henry Tsai
*Assistant Examiner* — Aurangzeb Hassan
(74) *Attorney, Agent, or Firm* — Sughrue Mion, PLLC

(57) ABSTRACT

A system interconnect is provided which includes a first channel configured to transmit a plurality of control signals based on a first clock, and a second channel configured to transmit a plurality of data signals which correspond to the control signals based on a second clock. The first channel and the second channel allows a predetermined range of out-of-orderness, and the predetermined range of the out-of-orderness indicates that an order of the control signals is different from an order of the data signals which correspond to the control signals.

7 Claims, 18 Drawing Sheets

(56) References Cited

U.S. PATENT DOCUMENTS

| | | | |
|---|---|---|---|
| 8,630,358 B2 | 1/2014 | Maji et al. | |
| 8,908,577 B2 * | 12/2014 | Walker | H04L 29/06027 |
| | | | 370/310 |
| 9,456,378 B2 * | 9/2016 | Zhu | H04W 28/0268 |
| 9,468,285 B2 * | 10/2016 | Martinez | A45F 5/02 |
| 2003/0198287 A1 | 10/2003 | Urzi et al. | |
| 2004/0123178 A1 | 6/2004 | Carpenter et al. | |
| 2004/0151209 A1 * | 8/2004 | Cummings | G06F 1/12 |
| | | | 370/503 |
| 2006/0112205 A1 | 5/2006 | Chang et al. | |
| 2007/0081414 A1 | 4/2007 | Douady et al. | |
| 2008/0005402 A1 | 1/2008 | Kim et al. | |
| 2009/0113097 A1 | 4/2009 | Drerup et al. | |
| 2011/0122982 A1 | 5/2011 | Yun et al. | |
| 2011/0131350 A1 | 6/2011 | Yun et al. | |
| 2011/0173357 A1 | 7/2011 | Ohmacht et al. | |
| 2011/0320854 A1 | 12/2011 | Elrabaa | |
| 2013/0111038 A1 * | 5/2013 | Girard | H04L 69/16 |
| | | | 709/226 |
| 2013/0251006 A1 * | 9/2013 | Maji | H04L 7/02 |
| | | | 375/219 |

* cited by examiner

FIG. 4

| Orders at M1 |
|---|
| AW1 |
| AW2 |

| Orders at S1 |
|---|
| AW4 |
| AW1 |

| Orders at M3 |
|---|
| AW3 |
| AW4 |

| Orders at S2 |
|---|
| AW2 |
| AW3 |

SYSTEM INTERCONNECT AND OPERATING METHOD OF SYSTEM INTERCONNECT

CROSS-REFERENCE TO RELATED APPLICATIONS

This application claims priority from Korean Patent Application No. 10-2014-0014260 filed Feb. 7, 2014, in the Korean Intellectual Property Office, the entire contents of which are hereby incorporated by reference.

BACKGROUND

Exemplary embodiments relate to an electronic circuit. In particular, exemplary embodiments relate to a system interconnect for connecting a plurality of master devices and a plurality of slave devices, and an operating method of the system interconnect.

Recently, a related art system-on-chip has been widely used. The related art system-on-chip includes a plurality of chips that are integrated on a chip and have different functions. In a design of the related art system-on-chip, it is essential to reduce a time necessary for development to cope with rapidly changing needs of the market. A technique of recycling a related art circuit block, that is, an intellectual property (IP) core may have been employed. The recycling of the IP core enables a time taken to develop products to be shortened and the reliability of the system-on-chip to be improved.

To design the system-on-chip effectively, the choice of interconnect for intercommunication among IP cores integrated on a chip is paramount. In the related art system-on-chip, the Advanced Microcontroller Bus Architecture (AMBA) bus of the Advanced RISC Machine (ARM) company is currently used as typical interconnect. The AMBA bus 2.0 includes Advanced High-Performance Bus (AHB) as a system bus and Advanced Peripheral Bus (APB) for connection with a peripheral device.

A pipelined operation, a multiple bus master, a burst transfer, and a split transaction characterize the AHB. However, when a master occupies a bus via the AHB, another master does not access a slave. That is, bus latency becomes longer in a system where a plurality of master devices is activated at the same time. The AXI protocol for making up for such a drawback and efficiently using a bus structure is defined in the AMBA 3.0 standard.

If an operating performance of the system bus is improved, operating performance of the overall system-on-chip is improved. Thus, there is a need for a system bus with improved operating performance.

SUMMARY

An aspect of the exemplary embodiments is directed to provide a system interconnect including a first channel configured to transmit control signals based on a first clock; and a second channel configured to transmit data signals which correspond to the control signals based on a second clock, wherein the first channel and the second channel allows a predetermined range of out-of-orderness, and wherein the predetermined range of the out-of-orderness indicates that an order of the control signals is different from an order of the data signals which correspond to the control signals.

In exemplary embodiments, the first channel includes a first A-node having a plurality of first input lines and a first output line, the second channel includes a second A-node having a plurality of second input lines and a second output line and having a same position as the first A-node, and the first A-node and the second A-node allow an out-of-orderness belonging to a first range.

In exemplary embodiments, the first A-node is configured to count a plurality of mismatch control signals to manage a count value, and the mismatch control signals are a plurality of control signals, which correspond to a plurality of data signals that don't pass the second A-node, from among a plurality of control signals which pass the first A-node.

In exemplary embodiments, the first A-node passes the control signals until the count value reaches the first range.

In exemplary embodiments, the first A-node decreases the count value in response to a data signal which corresponds to one of the mismatch control signals passing the second A-node.

In exemplary embodiments, the second A-node includes a queue configured to store the mismatch control signals, and in response to a data signal which corresponds to one of the mismatch control signals stored in the queue passing the second A-node, a mismatch control signal which corresponds to the passed data signal is deleted from the queue.

In exemplary embodiments, the first channel includes a first slave node having a first input line and a first output line connected to an external slave device, the second channel includes a second slave node having a second input line and a second output line connected to the external slave device and having a same position as the first slave node, and the first slave node and the second slave node rearrange orders of the received control signals and the received data signals to transfer the rearranged control signals and the rearranged data signals.

In exemplary embodiments, the first slave node includes a rearrangement buffer configured to store the received control signals, and a control signal, which corresponds to a currently received data signal, from among the stored control signals in the rearrangement buffer, is transferred to the external slave device.

In exemplary embodiments, the first slave node transfers to the external slave device a control signal, which has a same source node as a source node of the currently received data signal, from among the stored control signals in the rearrangement buffer.

In exemplary embodiments, the first channel is further configured to stop transferring the control signals in response to a degree of out-of-orderness reaching the predetermined range.

Another aspect of an exemplary embodiment is directed to provide an operating method of a system interconnect which connects a plurality of master devices and a plurality of slave devices, the operating method including receiving a control signal from one of the plurality of master devices; and transmitting the control signal regardless of an order in response to a count value being less than a critical value, wherein in the system interconnect, the order includes a first order for transferring a plurality of control signals and a second order for transferring a plurality of data signals which correspond to the plurality of control signals respectively, wherein the count value indicates a number of mismatched control signals which are transferred where corresponding data signals are not transferred.

In exemplary embodiments, the operating method further includes transmitting the control signal and a corresponding data signal regardless of the order in response to the count value being equal to the critical value and the corresponding data signal arriving.

In exemplary embodiments, the operating method further includes blocking the control signal in response to the count value being equal to or greater than the critical value.

In exemplary embodiments, the operating method further includes decreasing the count value in response to a data signal corresponding to one of the mismatched control signals being transferred.

In exemplary embodiments, the operating method further includes waiting until a corresponding data signal, which corresponds to the transmitted control signal, is sent; and rearranging the transmitted control signal and the corresponding transmitted data signal to provide a result of the rearrangement to one of the plurality of slave devices.

Another aspect of an exemplary embodiment is directed to provide an operating method of an A-node, the method including receiving a first request of the A-node; determining whether an out of order count is smaller or equal to a critical value; transmitting the first request to a next state node in response to the out or order count being smaller than the critical value; setting a hold state of the A-node in response to the out of order count being greater than the critical value; and determining whether the first request is in a ready state in response to the out of order count being equal to the critical value.

With exemplary embodiments, communication between a first interconnect and a second interconnect that have different clock domains is minimized, and restricted out-of-orderness is provided to a system interconnect. An allowable degree of out-of-orderness is determined according to whether it is possible to minimize the latency and whether it is possible to minimize overhead due to a queue size and a buffer size. Thus, the exemplary embodiments may provide the system interconnect with optimized operating performance and an operating method of the system interconnect.

BRIEF DESCRIPTION OF THE DRAWINGS

The above and other objects and features will become apparent from the following description with reference to the following figures, wherein like reference numerals refer to like parts throughout the various figures unless otherwise specified, and wherein

FIGS. 3 to 5 are diagrams for describing an example in which deadlock occurs at a first interconnect and a second interconnect;

DETAILED DESCRIPTION OF THE EXEMPLARY EMBODIMENTS

Figure 1:
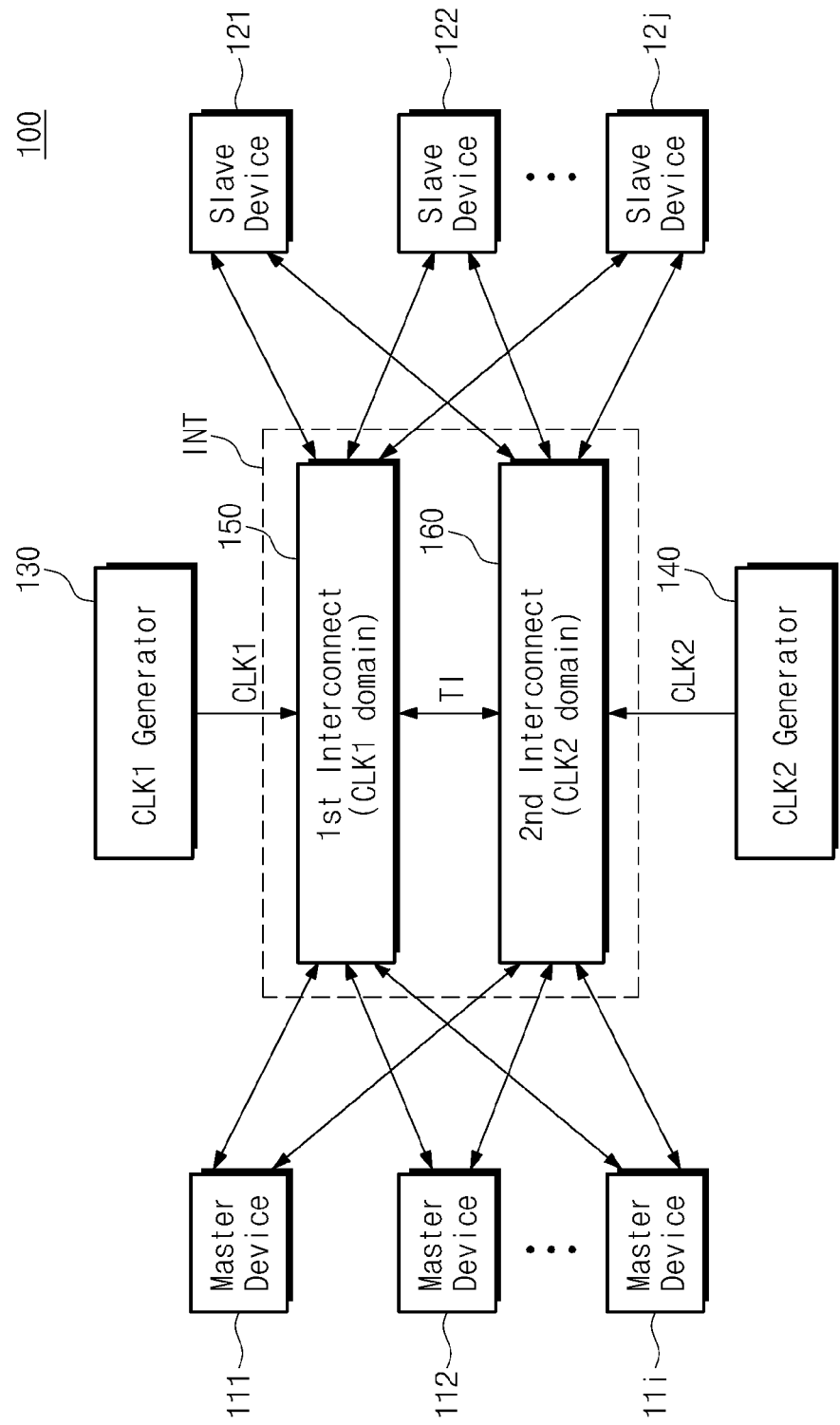
FIG. 1 is a block diagram schematically illustrating a semiconductor chip according to an embodiment.

Exemplary embodiments will be described in detail with reference to the accompanying drawings. The exemplary embodiments, however, may be embodied in various different forms, and should not be construed as being limited only to the illustrated embodiments. Rather, these embodiments are provided as examples so that this disclosure will be thorough and complete, and will fully convey the concept to those skilled in the art. Accordingly, known processes, elements, and techniques are not described with respect to some of the exemplary embodiments. Unless otherwise noted, like reference numerals denote like elements throughout the attached drawings and written description. Thus, descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the exemplary embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which these exemplary embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a semiconductor chip 100 according to an embodiment. For example, a semiconductor chip 100 may be a system-on-chip. Referring to FIG. 1, the semiconductor chip 100 includes a plurality of master devices 111 to 11$i$, a plurality of slave devices 121 to 12$j$, a first clock generator 130, a second clock generator 140, a first interconnect 150, and a second interconnect 160.

The master devices 111 to 11$i$ may access the slave devices 121 to 12$j$ through the first and second interconnects 150 and 160. The master devices 111 to 11$i$ may include, but not limited to, a central processing unit (CPU), a graphics processing unit (GPU), and a microcontroller.

The slave devices 121 to 12$j$ may be controlled by the master devices 111 to 11$i$ via the first and second interconnects 150 and 160. The slave devices 121 to 12$j$ may include, but not limited to, a memory and a memory controller.

The first clock generator 130 outputs a first clock CLK1, and the second clock generator 140 outputs a second clock CLK2. A frequency of the first clock CLK1 is different from a frequency of the second clock CLK2. A frequency of the first clock CLK1 is lower than a frequency of the second clock CLK2.

The first interconnect 150 connects the master devices 111 to 11$i$ and the slave devices 121 to 12$j$. The first interconnect 150 transmits transaction information TI to the second interconnect 160. The transaction information TI may include information about a signal that is transmitted via the first interconnect 150. The first interconnect 150 operates based on the first clock CLK1.

The second interconnect 160 connects the master devices and the slave devices 121 to 12$j$. The second interconnect 160 transmits transaction information TI to the first interconnect 150. The transaction information TI may include information about a signal that is transmitted via the second interconnect 160. The second interconnect 160 operates based on the second clock CLK2.

The first interconnect 150 and the second interconnect 160 are associated with each other in operations. The first interconnect 150 and the second interconnect 160 may constitute an interconnect INT of the semiconductor chip 100. For example, the first interconnect 150 may be a control channel through which control information such as, but not limited to, an address and a command is transferred, and the second interconnect 160 may be a data channel through which data is transferred. Since the amount of information transferred via the data channel is greater than the amount of information transferred via the control channel, a frequency of an operating clock of the second interconnect 160 being the data channel is set to be higher than a frequency of an operating clock of the first interconnect 150 being the control channel. Thus, the first interconnect 150 and the second interconnect 160 may be configured such that the second interconnect 160 being the data channel has greater throughput and the first interconnect 150 being the control channel has a very complicated pipeline structure.

In exemplary embodiments, the first interconnect 150 may correspond to a read address (AR) channel and a write address (AW) channel that are defined by the AXI4 specification. Signals transferred via the first interconnect 150 may include, but not limited to, AWRITE, ADPATH, ARPATH, AID, AADDR, ALEN, ASIZE, ABURST, ALOCK, ACACHE, APROT, AQOS, AUSER, AVALID, and AREADY. The AWRITE, ADPATH, ARPATH, AID, AADDR, ALEN, ASIZE, ABURST, ALOCK, ACACHE, APROT, AQOS, AUSER, and AVALID are generated from a master device, and the AREADY is generated from a slave device.

AWRITE indicates whether a request is a write request or a read request. A high level of AWRITE indicates a write request, and a low level thereof indicates a read request. ADPATH signifies a decoding path. ADPATH includes information about a path which a request passes through until it arrives at a destination. ARPATH indicates a return path. ARPATH may include information about a path which a response to a request passes through until it arrives at a source. AID signifies an identifier of a write or read request (or, an address). AID may be a transaction identifier. AADDR indicates an address. AADDR is a start address of a burst operation.

ALEN indicates a burst length that is the number of transmissions at a burst operation. ASIZE signifies a burst size. ASIZE indicates the size of transmission at the burst operation. ABURST indicates a burst type. ABURST may include information about how an address of each transmission is calculated. ALOCK indicates a lock type. ALOCK may provide additional information about an atomic characteristic of transmission. ACACHE signifies a memory type. ACACHE may indicate how much a transaction is required in a system.

APROT indicates a protection type. APROT indicates authority and security level of a transaction and indicates whether an access is a data access or a command access. AQOS means a service quality. AUSER signifies a user signal, and AUSER is a reserved signal defined by a user. AVALID indicates whether an address is valid. AVALID indicates whether to signal a valid address and control information. AVALID signifies whether a signal to be transmitted from a master device or a node of a master side exists.

AREADY means address ready. AREADY indicates whether it is ready for a slave device or a node of a slave side to receive a signal.

In exemplary embodiments, the first interconnect 150 may correspond to a write response (B) channel defined in the AXI4 specification. Signals transferred via the first interconnect 150 may include, but not limited to, BRPATH, BID, BRESP, BUSER, BVALID, and BREADY. BRPATH, BID, BRESP, BUSER, and BVALID are generated from a slave device, and BREADY is generated from a master device.

BRPATH indicates a return path. BRPATH may include information about a path which a response passes through until it arrives at a source. BID may be an identifier indicating a write response. BRESP indicates a state of a write transaction. BUSER is a reserved signal that is defined by a user. BVALID signifies whether a write response to be transmitted from a slave device or a node of a slave side exists. BREADY is indicative of whether a master device or a node of a master side can receives a write response.

In exemplary embodiments, the second interconnect 160 may correspond to an R (read response) channel defined in the AXI4 specification. Signals transferred via the second interconnect 160 may include, but not limited to, RRPATH, RID, RDATA, RRESP, RLAST, RUSER, RVALID, and RREADY. RRPATH, RID, RDATA, RRESP, RLAST, RUSER, and RVALID are generated from a slave device, and RREADY is generated from a master device.

RRPATH indicates a return path. RRPATH may include information about a path which a response passes through until it arrives at a source. RID may be an identifier indicating a read response. RDATA is read data, and RRESP indicates a read response. RRESP is indicative of a read transmission state. RLAST indicates the last transmission at a read burst. RUSER is a reserved signal that is defined by a user. RVALID signifies whether a read response to be transmitted from a slave device or a node of a slave side exists. RREADY is indicative of whether a master device or a node of a master side can receives a read response.

In exemplary embodiments, the second interconnect 160 may correspond to a write data (W) channel defined in the AXI4 specification. Signals transmitted via the second interconnect 160 may include, but not limited to, WDPATH, WRPATH, WDATA, WSTRB, WLAST, WUSER, WVALID, and WREADY. WDPATH, WRPATH, WDATA, WSTRB, WLAST, WUSER, and WVALID are generated from a master device, and WREADY is generated from a slave device.

WDPATH is indicative of a decoding path. WDPATH may include information about a path which a write response passes through until it arrives at a destination. WRPATH signifies a return path. WRPATH may include information about a path which a write response passes through until it arrives at a source. WDATA is write data, and WSTRB is a write strobe signal. WSTRB indicates that any byte lane has valid data. WLAST means the last transmission at a write burst operation. WUSER is a reserved signal that is defined by a user. WVALID signifies whether write data and a strobe signal to be transmitted from a master device or a node of a master side exists. WREADY is indicative of whether a slave device or a node of a slave side receives write data.

Below, the first interconnect 150 is assumed to be the AW channel. A signal that is transmitted via the first interconnect 150 and includes an address requesting a data write operation is referred to as an AW request. However, the first interconnect 150 is not limited to the AW channel. The second interconnect 160 is assumed to be the W channel. A signal that is transmitted via the second interconnect 160 and includes write data is referred to as a W request. However, the second interconnect 160 is not limited to the W channel.

Figure 2:
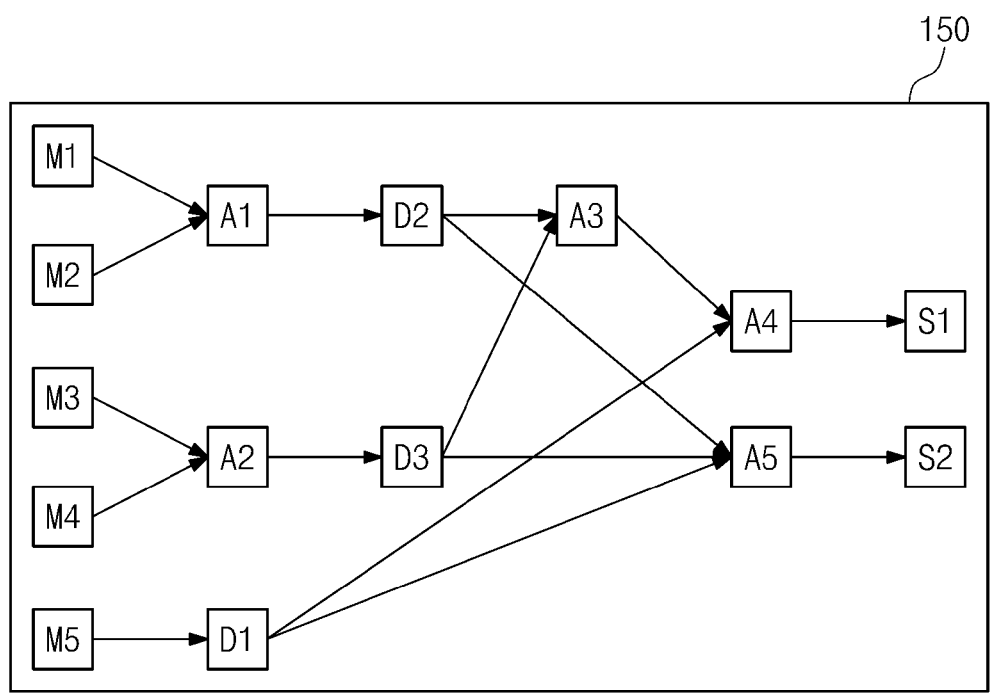
FIG. 2 is a block diagram schematically illustrating a first interconnect and a second interconnect according to an embodiment.
Figure 2:
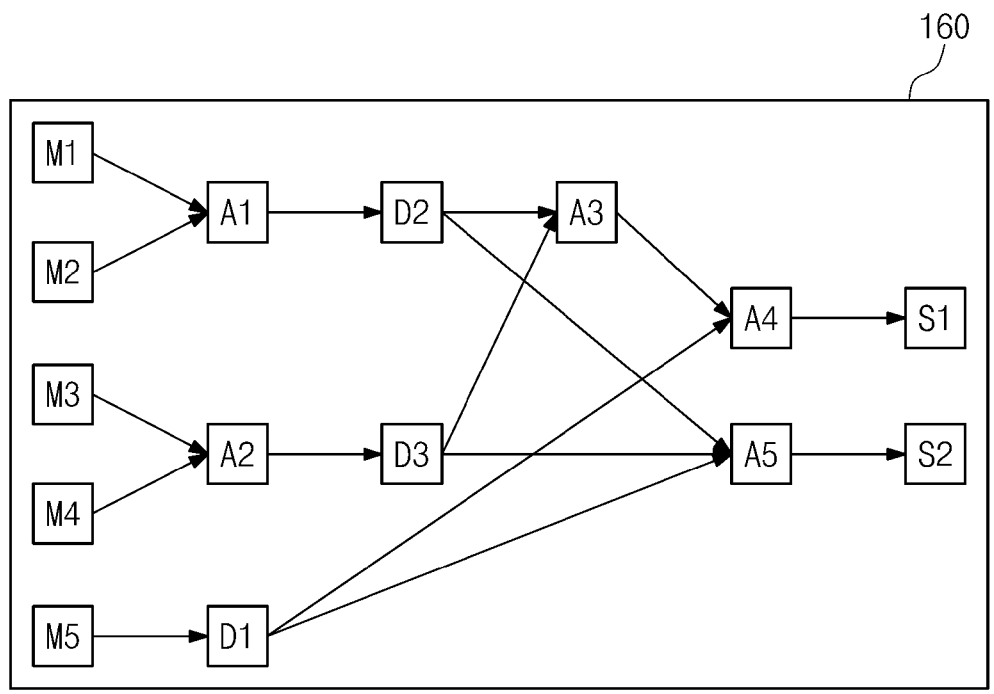

FIG. 2 is a block diagram schematically illustrating a first interconnect 150 and a second interconnect 160 according to an exemplary embodiment. It is assumed that each of a first interconnect 150 and a second interconnect 160 is connected to five master devices and two slave devices and operates. However, the number of master and slave devices connected to the first interconnect 150 and the second interconnect 160 is not limited.

For example, the first interconnect 150 and the second interconnect 160 have the same topology. The first interconnect 150 and the second interconnect 160 have the same structure. In FIG. 2, the first interconnect 150 and the second interconnect 160 are illustrated to have separated nodes. However, since the first interconnect 150 and the second interconnect 160 have the same topology, they may have shared nodes. For example, a node at a specific location of the first interconnect 150 and a node of the second interconnect 160 at the same location as the node of the first interconnect 150 may be implemented with a single node. The single node may be configured to support functions of the first interconnect 150 and the second interconnect 160.

For descriptive convenience, a function or a configuration that is applied in common to the first interconnect 150 and the second interconnect 160 will be described with reference to the first interconnect 150. A function or a configuration that is not applied in common to the first interconnect 150 and the second interconnect 160 will be described with reference to the first interconnect 150 and the second interconnect 160, respectively.

Referring to FIG. 2, the first interconnect 150 includes first to fifth master nodes M1 to M5, first to fifth A-nodes A1 to A5, first to third D-nodes D1 to D3, and first and second slave nodes S1 and S2.

The first to fifth master nodes M1 to M5 may be interface nodes that are connected with external master devices.

Each of the first to fifth A-nodes A1 to A5 may have a plurality of input lines and an output line. Each of the first to fifth A-nodes A1 to A5 may receive a signal (e.g., AW request) from one of the plurality of input lines and transfers the input signal (e.g., AW request) to the output line. The first A-node A1 has input lines connected to the first and second master nodes M1 and M2 and an output line connected to the second D-node D2. The second A-node A2 has input lines connected to the third and fourth master nodes M3 and M4 and an output line connected to the third D-node D3. The third A-node A3 has input lines connected to the second and third D-nodes D2 and D3 and an output line connected to the fourth A-node A4. The fourth A-node A4 has input lines connected to the first D-node D1 and the third A-node A3 and an output line connected to the first slave node S1. The fifth A-node A5 has input lines connected to the first, second, and third D-nodes D1, D2, and D3 and an output line connected to the second slave node S2.

Each of the first to third D-nodes D1 to D3 has an input line and a plurality of output lines. Each of the first to third D-nodes D1 to D3 receives a signal (e.g., AW request) via the input line and transfers the received signal (e.g., AW request) to one of the plurality of output lines. The first D-node D1 has an input line connected to the fifth master node M5 and output lines connected to the fourth and fifth A-nodes A4 and A5. The second D-node D2 has an input line connected to the first A-node A1 and output lines connected to the third and fifth A-nodes A3 and A5. The third D-node D3 has an input line connected to the second A-node A2 and output lines connected to the third and fifth A-nodes A3 and A5.

The first and second slave nodes S1 and S2 may be interface nodes that are connected with external slave devices.

The first interconnect 150 and the second interconnect 160 can require orderness. The orderness may mean that an order of an AW request transferred via the first interconnect 150 conforms to an order of a W request transferred via the second interconnect 160. That is, in a specific node of the nodes M1 to M5, A1 to A5, D1 to D3, S1, and S2, after a first AW request is transmitted, a second AW request is transmitted. If the orderness is required, in a node at the same location in the second interconnect 160, a second W request associated with the second AW request is transferred after a first W request associated with the first AW request is transferred.

If the orderness is required, all nodes of the first interconnect 150 and second interconnect 160 harmonize orders of AW requests and W requests.

To guarantee the orderness, all nodes M1 to M5, A1 to A5, D1 to D3, S1, and S2 of the first interconnect 150 and the second interconnect 160 are equipped with a hold function. For example, a first AW request is transmitted at a specific node of the first interconnect 150. The specific node of the first interconnect 150 may not transfer another AW request until a first W request is sent at a node at the same location of the second interconnect 160. That is, the specific node of the first interconnect 150 waits at a hold state until a W request corresponding to an transferred AW request is transmitted.

In this case, the orderness is guaranteed, but latency of the first interconnect 150 and the second interconnect 160 increases.

The first interconnect 150 and the second interconnect 160 may support out-of-orderness. The out-of-orderness may mean that an order of an AW request transmitted via the first interconnect 150 does not conform to an order of a W request transferred via the second interconnect 160. For example, a second AW sent after a first AW request is transmitted at a specific node of nodes M1 to M5, A1 to A5, D1 to D3, S1, and S2 of the first interconnect 150. If the out-of-orderness is supported, a first W request associated with the first AW request is transferred after a second W request associated with the second AW request (or, a write address) is transferred at a node at the same location of the second interconnect 160.

When the out-of-orderness is supported, latency of the first interconnect 150 and the second interconnect 160 decreases and operating performance is improved. However, deadlock may occur at the first interconnect 150 and the second interconnect 160 when the out-of-orderness is supported. The deadlock may mean that a slave device does not operate normally because orders of AW requests and W requests arriving at the slave device are entwined.

Figure 3:
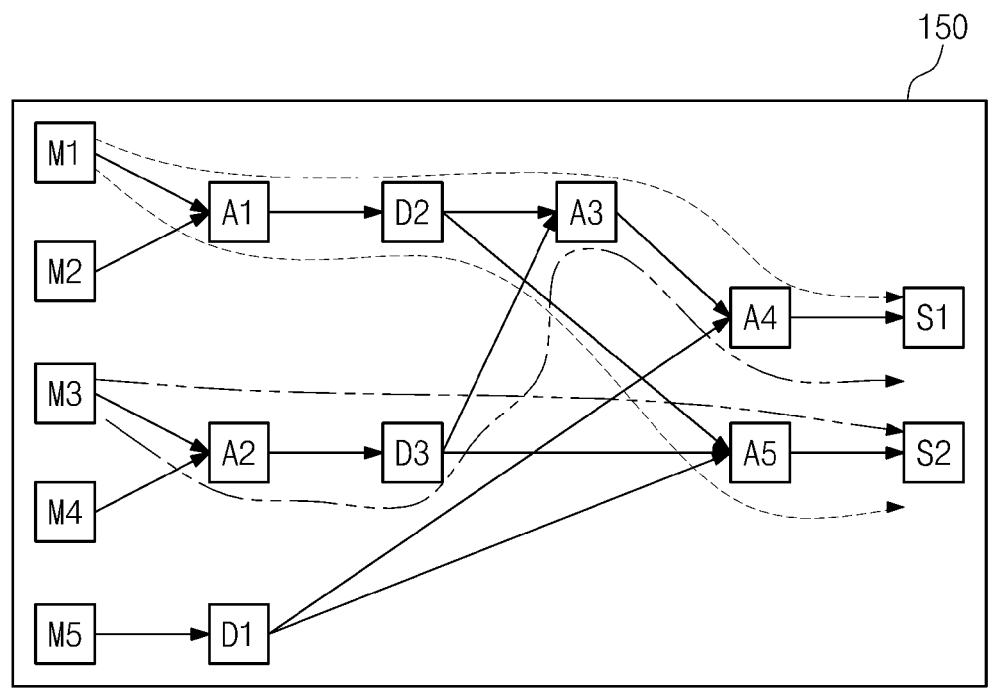
Figure 3:
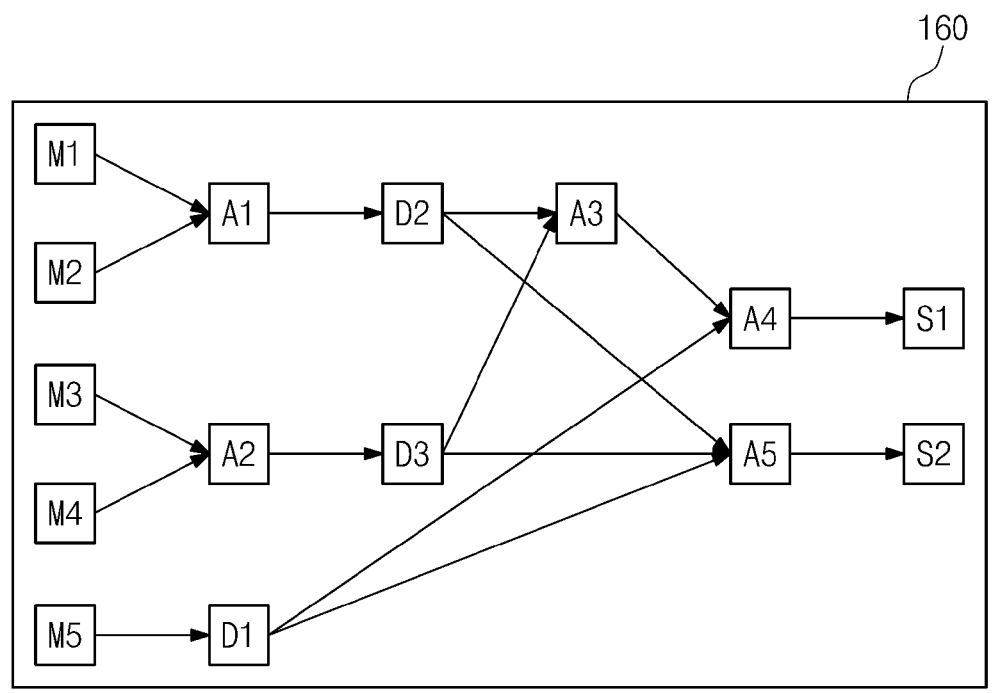
Figure 5:
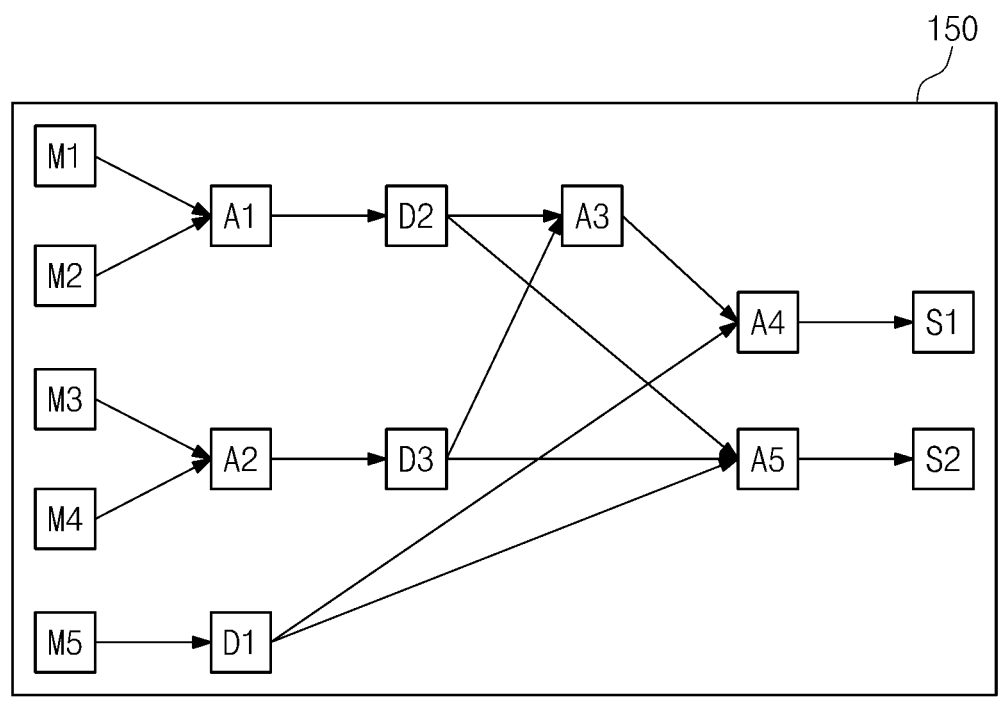
Figure 5:
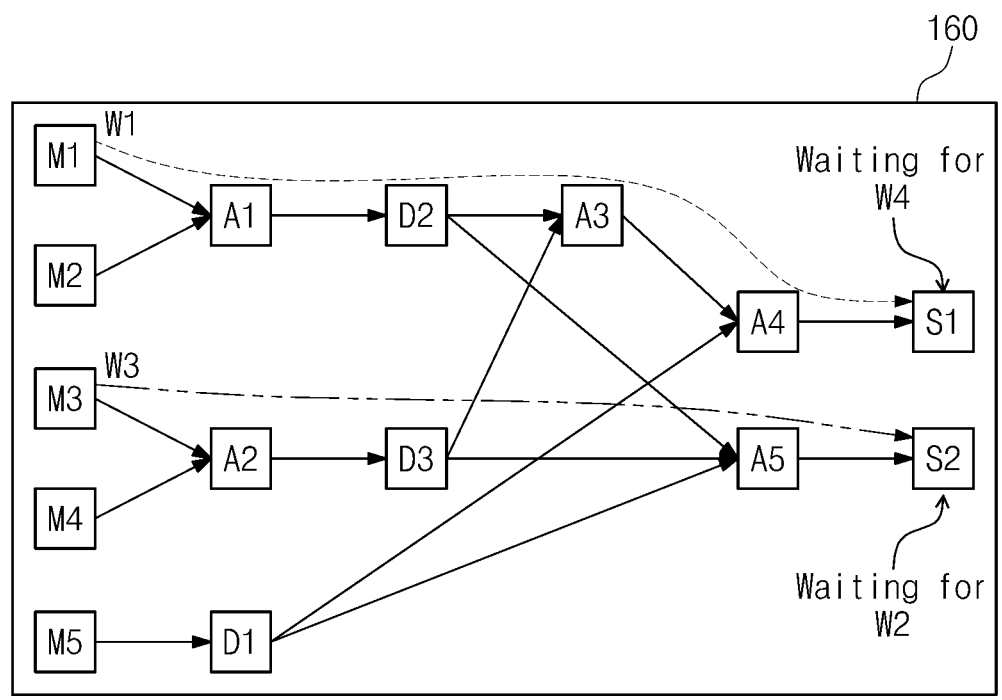

FIGS. 3 to 5 are diagrams for describing an example in which deadlock occurs at a first interconnect 150 and a second interconnect 160. In FIG. 3, there is illustrated an example in which an AW request is transferred. Referring to FIG. 3, a master device (e.g., a first master device) connected to a first master node M1 issues a first AW request AW1 and a second AW request AW2. The first AW request AW1 is transferred to a slave device (e.g., a first slave device) through a first master node M1, a first A-node A1, a second D-node D2, a third A-node A3, a fourth A-node A4, and a first slave node S1. The second AW request AW2 is sent to a slave device (e.g., a second slave device) through the first master node M1, the first A-node A1, the second D-node D2, a fifth A-node A5, and a second slave node S2.

A master device (e.g., a third master device) connected to a master node M3 issues a third AW request AW3 and a fourth AW request AW4. The third AW request AW3 is transmitted to the second slave device via a third mater node M3, a second A-node A2, a third D-node D3, the fifth A-node A5, and the second slave device S2. The fourth AW request AW4 is provided to the first slave device through the third master node M3, the second A-node A2, the third D-node D3, the third A-node A3, the fourth A-node A4, and the first slave node S1.

FIG. 4 is a diagram schematically illustrating tables including orders of first to fourth AW requests AW1 to AW4 at master nodes M1 and M3 and slave nodes S1 an S2. Referring to FIGS. 3 and 4, at a first master node M1, a second AW request AW2 is sent after a first AW request AW1 is transferred. That is, after sending the first AW request AW1, a first master device transfers the second AW request AW2.

At a third master node M3, a fourth AW request AW4 is sent after a third AW request AW3 is transferred. That is, after sending the third AW request AW3, a second master device transfers the fourth AW request AW4.

At a first slave node S1, the fourth AW request AW4 is sent after the first AW request AW1 is transferred. That is, after receiving the first AW request AW1, a first slave device receives the fourth AW request AW4.

At a second slave node S2, the third AW request AW3 is sent after the second AW request AW2 is transferred. That is, after receiving the second AW request AW2, a second slave device receives the third AW request AW3.

FIG. 5 shows an example where W requests W1 and W3 are transmitted. Referring to FIGS. 3 and 5, since a first master device sends a first AW request AW1 prior to a second AW request AW2, it transfers a first W request W1 associated with a first AW request AW1 prior to a second W request W2 associated with a second AW request AW2.

Likewise, since a third master device sends a third AW request AW3 prior to a fourth AW request AW4, it transfers a third W request W3 associated with a third AW request AW3 prior to a fourth W request W4 associated with a fourth AW request AW4.

The first W request W1 is transferred to a first slave device via a first master node M1, a first A-node A1, a second D-node D2, a third A-node A3, a fourth A-node A4, and a first slave node S1. The third W request W3 is sent to a second slave device via the third master node M3, a second A-node A2, a third D-node D3, a fifth A-node A5, and a second slave node S2.

Because the first slave device first receives the fourth AW request AW4, it waits to receive the fourth W request W4 associated with the fourth AW request AW4. If the first slave device receives not the fourth W request W4 but the first W request W1, it does not process the first W request W1. Thus, the first slave device has a deadlock.

Because the second slave device first receives the second AW request AW2, it waits to receive the second W request W2 associated with the second AW request AW2. If the second slave device receives not the second W request W2 but the third W request W3, it does not process the third W request W3. Thus, the second slave device has deadlock.

A related art method in which a topology is restricted may prevent the deadlock. However, a restriction on the topology makes it difficult to design the first interconnect 150 and the second interconnect 160, thereby lowering the performance.

Figure 6:
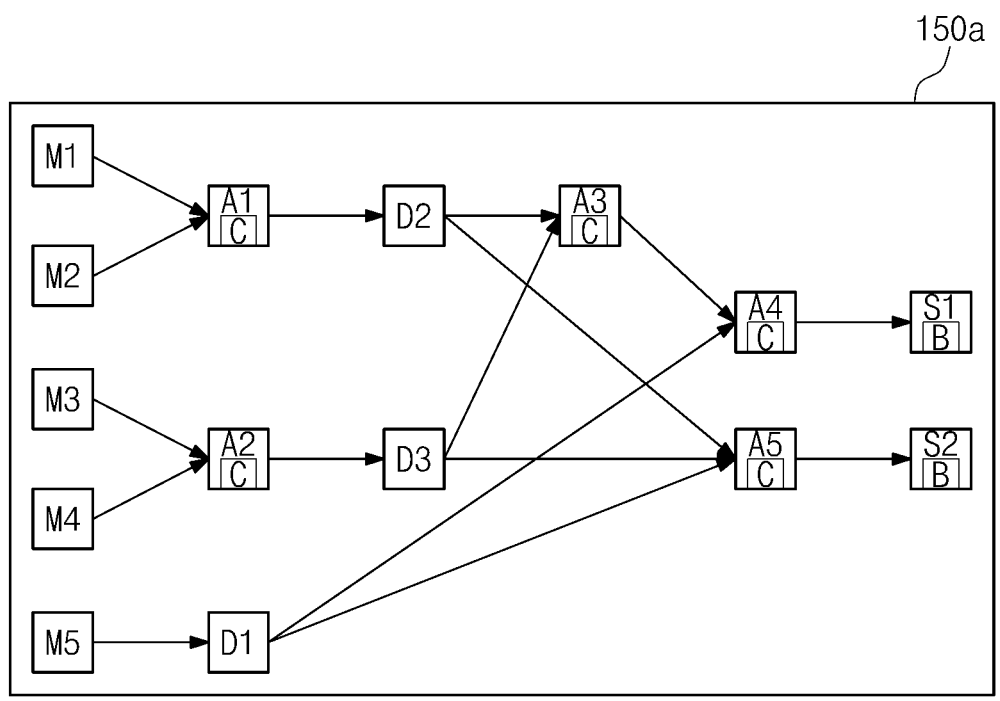
FIG. 6 is a block diagram schematically illustrating a first interconnect and a second interconnect according to another embodiment.
Figure 6:
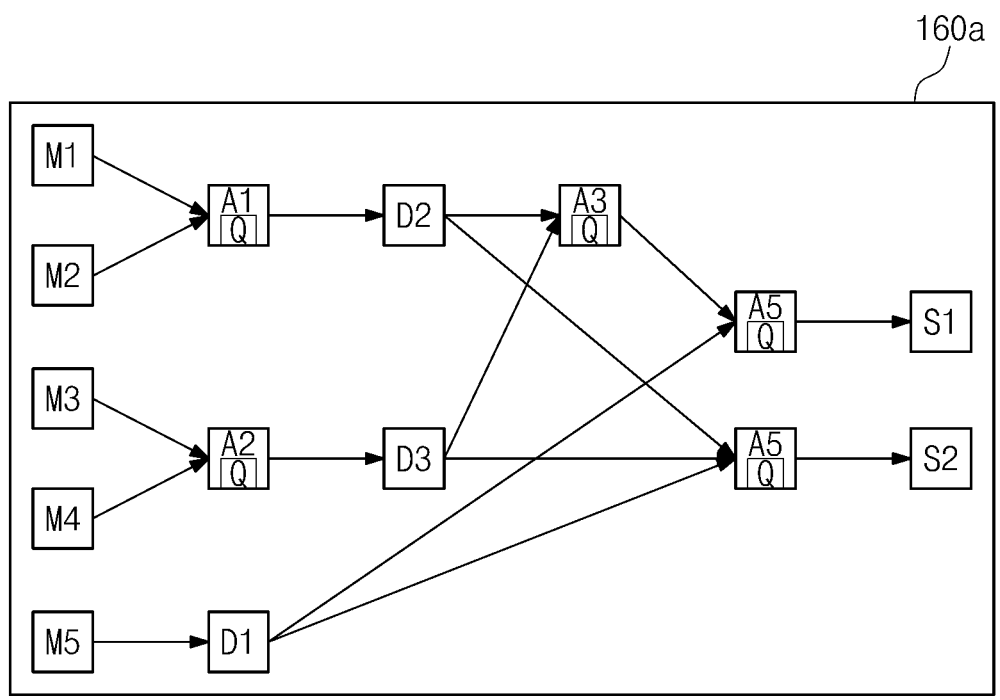

FIG. 6 is a block diagram schematically illustrating a first interconnect 150a and a second interconnect 160b according to another exemplary embodiment. It is assumed that each of a first interconnect 150a and a second interconnect 160a is connected to five master devices and two slave devices and operates. However, the number of master and slave devices connected to the first interconnect 150a and the second interconnect 160a is not limited. Also, it is assumed that the first interconnect 150a is an AW channel. A signal that is transferred via the first interconnect 150a and includes an address for requesting a data write operation is referred to as an AW request. The first interconnect 150a is not limited to the AW channel. The second interconnect 160a is assumed to be a W channel. A signal that is transmitted via the second interconnect 160a and includes write data is referred to as a W request. The second interconnect 160a is not limited to the W channel.

For example, the first interconnect 150a and the second interconnect 160 have the same topology. The first interconnect 150a and the second interconnect 160a have the same structure. In FIG. 6, the first interconnect 150a and the second interconnect 160a are illustrated to have separated nodes. However, since the first interconnect 150a and the second interconnect 160a have the same topology, they may have shared nodes. For example, a node at a specific location of the first interconnect 150a and a node of the second interconnect 160a at the same location as the node of the first interconnect 150a may be implemented with a node.

For descriptive convenience, a function or configuration that is applied in common to the first interconnect 150a and the second interconnect 160a will be described with reference to the first interconnect 150a. A function or configuration that is not applied in common to the first interconnect 150a and the second interconnect 160a will be described with reference to the first interconnect 150a and the second interconnect 160a, respectively.

Referring to FIG. 6, the first interconnect 150a includes first to fifth master nodes M1 to M5, first to fifth A-nodes A1 to A5, first to third D-nodes D1 to D3, and first and second slave nodes S1 and S2.

The first to fifth master nodes M1 to M5 may be interface nodes that are connected with external master devices.

Each of the first to fifth A-nodes A1 to A5 may have a plurality of input lines and an output line. Each of the first to fifth A-nodes A1 to A5 may receive a signal from one of the plurality of input lines and transfer the input signal to the output line. The first A-node A1 has input lines connected to the first and second master nodes M1 and M2 and an output line connected to the second D-node D2. The second A-node A2 has input lines connected to the third and fourth master nodes M3 and M4 and an output line connected to the third D-node D3. The third A-node A3 has input lines connected to the second and third D-nodes D2 and D3 and an output line connected to the fourth A-node A4. The fourth A-node A4 has input lines connected to the first D-node D1 and the third A-node A3 and an output line connected to the first slave node S1. The fifth A-node A5 has input lines connected to the first, second, and third D-nodes D1, D2, and D3 and an output line connected to the second slave node S2.

Each of the first to third D-nodes D1 to D3 has an input line and a plurality of output lines. Each of the first to third D-nodes D1 to D3 receives a signal via the input line and transfers the received signal to one of the plurality of output lines. The first D-node D1 has an input line connected to the fifth master node M5 and output lines connected to the fourth and fifth A-nodes A4 and A5. The second D-node D2 has an input line connected to the first A-node A1 and output lines connected to the third and fifth A-nodes A3 and A5. The third D-node D3 has an input line connected to the second A-node A2 and output lines connected to the third and fifth A-nodes A3 and A5.

The first and second slave nodes S1 and S2 may be interface nodes that are connected with external slave devices.

Each of the first to fifth A-nodes A1 to A5 in the first interconnect 150a has a counter C. The counters C may be configured to manage an out-of-order count. In each counter C, the out-of-order count means a degree of out-of-orderness of an A-node which a counter C corresponding to the out-of-order count includes. The out-of-order count may be the number of AW requests (hereinafter, referred to as a mismatch AW request) that passes without a W request in A-nodes (e.g., the third A-node A3) of the first interconnect 150a and the second interconnect 160a placed at the same position.

Each of the first to fifth A-nodes A1 to A5 of the second interconnect 160a includes a queue Q for storing information about mismatch AW requests.

Each A-node of the second interconnect 160a compares a received W request with information about mismatch AW requests stored in the queue Q. If the received W request is determined to be paired with one of the mismatch AW requests stored in the queue Q, each A-node of the second interconnect 160a passes the received W request.

Each of the first and second slave nodes S1 and S3 has a rearrangement buffer B for storing mismatch AW requests. When the W request is transferred to each slave node of the second interconnect 160a, a slave node of the first interconnect 150a corresponding to the slave node of the second interconnect 160a compares the W request with mismatch AW requests stored in the rearrangement buffer B. The slave node of the first interconnect 150a may provide a slave device with a mismatch AW request paired with the W request. Each slave node of the second interconnect 160a transfers the W request to a slave device.

The first to third D-nodes D1 to D3 may transfer input requests to next-stage nodes regardless of orders of AW requests and W requests. The first to fifth A-nodes A1 to A5 allow a predetermined degree of out-of-orderness between AW requests and W requests. The first and second slave nodes S1 and S2 allow a predetermined degree of out-of-orderness between AW requests and W requests. The first and second slave nodes S1 and S2 corrects the out-of-orderness within an allowed range to send AW requests and W requests with the corrected order to slave devices.

Operating rules of the first and second interconnects 150a and 160b will now be described.

An operating frequency of the first interconnect 150a is different from an operating frequency of the second interconnect 160a. The first interconnect 150a operates using a first clock CLK1, and the second interconnect 160a operates using a second clock CLK2 of which a frequency is higher than that of the first clock CLK1. The first interconnect 150a and the second interconnect 160a may operate either a synchronous manner or an asynchronous manner.

If a W request is first transmitted via the second interconnect 160a, a master device or a node of a master side has to assure a transfer of an AW request corresponding to the first transmitted W request. Also, a slave device or a node of a slave side has to assure a reception of an AW request corresponding to the first transmitted W request. The master device or the node of the master side does not first transmit the W request if it is impossible to send the AW request. Likewise, the slave device or the node of the slave side does not first receive the W request if it is impossible to receive the AW request. That is, the master device and the slave device may guarantee orderness between the AW request and the W request.

Each node of the second interconnect 160a may transfer a specific W request corresponding to a specific AW request only after the specific AW request is sent at a node at the same position of the first interconnect 150a.

The first interconnect 150a and the second interconnect 160a have the same topology.

An AW request transmitted via the first interconnect 150a has an identifier, and a W request transmitted via the second interconnect 160a has an identifier. A pair of an AW request and a W request may be identified using the identifiers.

The first interconnect 150a and the second interconnect 160a support a restricted out-of-orderness. Each node of the first interconnect 150a and the second interconnect 160a may support an out-of-orderness corresponding to a critical value. Critical values of the nodes may be different from one another. The critical value indicates the number of AW requests that can be transferred to a next stage although a W request is not transmitted at a node at the same position of the first interconnect 150a and a specific node of the second interconnect 160a.

Whenever an AW request passes at each node of the first interconnect 150a, information reporting that any AW request passes through a node may be provided to the second interconnect 160a as transaction information TI. For example, the first interconnect 150a provides the second interconnect 160a with ARPATH of a transferred AW request as the transaction information TI. The transaction information TI may be sent via a clock bridge, for example, an asynchronous first in first out (FIFO) circuit.

Whenever a W request is received at each node of the second interconnect 160a, information reporting that any W request is received may be provided to the first interconnect 150a as transaction information TI. For example, the second interconnect 160a provides the first interconnect 150a with WFIRST, indicating that a first burst transfer of the W request is received, as the transaction information TI. The transaction information TI may be sent via a clock bridge, for example, an asynchronous FIFO circuit.

Figure 7:
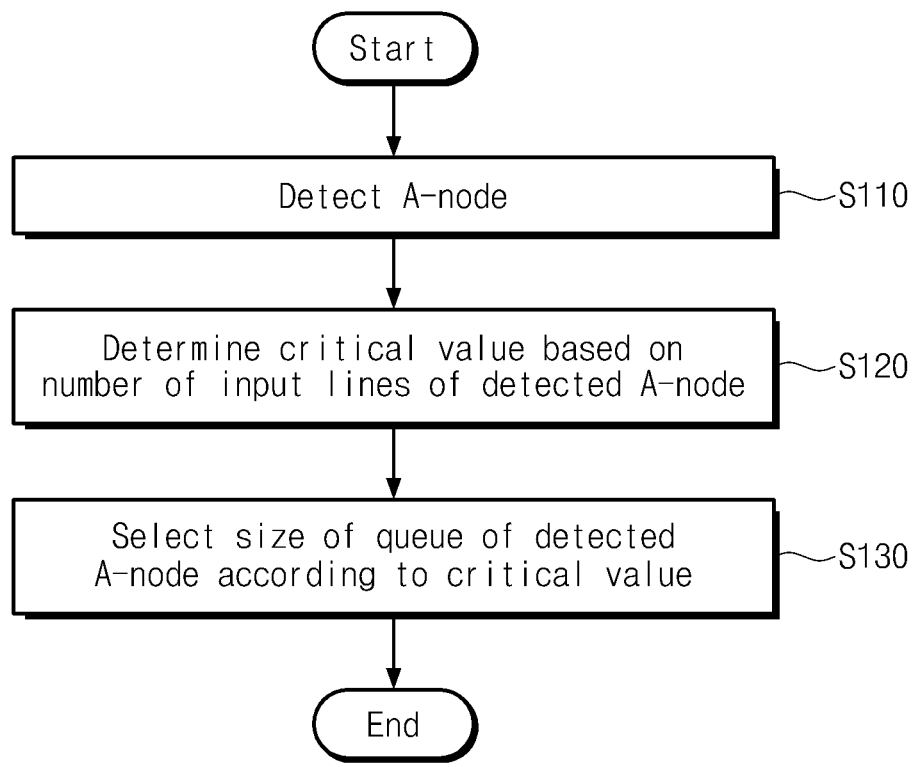
FIG. 7 is a flow chart schematically illustrating a method of deciding the size of queue.

FIG. 7 is a flow chart schematically illustrating a method of deciding the size of queue Q. Referring to FIGS. 6 and 7, in step S110, an A-node is detected. In step S120, a critical value is decided based on the number of input lines of the detected A-node. The critical value indicates an allowable degree of out-of-orderness of the A-node. In step S130, the size of queue Q of the detected A-node is selected according to the critical value. The queue Q is provided to make it possible for each A-node to support out-of-orderness. Each A-node may support out-of-orderness as many as the number which corresponds to the critical value, using the queue Q.

Critical values of rearrangement buffers B of first and second slave nodes S1 and S2 may be determined in the same method as described with reference to FIG. 7, except that the A-node is replaced with a slave node.

Figure 8:
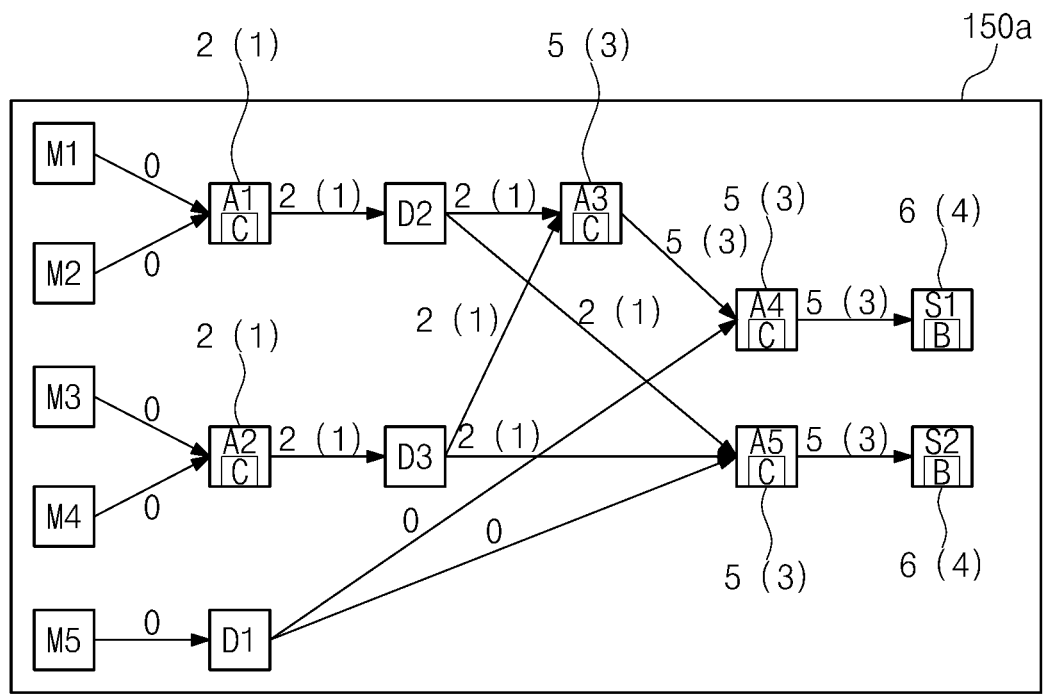
FIG. 8 is a diagram schematically illustrating an example in which critical values are determined.
Figure 8:
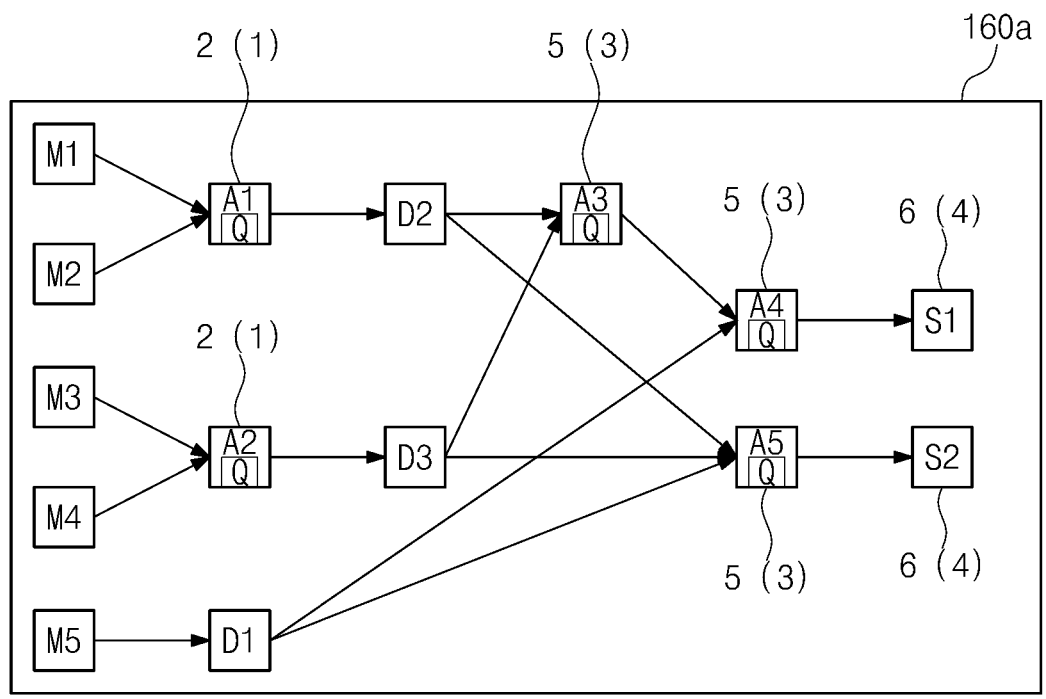

FIG. 8 is a diagram schematically illustrating an example in which critical values are determined. Referring to FIG. 8, critical values of output lines of master nodes M1 to M5 are sequentially calculated. The critical values of the lines may mean a degree of out-of-orderness which make it possible to exchange orders of AW requests and W requests transferred via input lines. It is impossible to exchange orders of an AW request and a W request that a master device transfers. An order of AW requests transferred by a master device is equal to that of W requests transferred by the master device. Thus, critical values of lines connected to the master nodes M1 to M5 may be "0".

Critical values of A-nodes are determined. Each A-node outputs AW requests received via a plurality of lines to an output line. In this case, orders of AW requests and W requests can be exchanged at each A-node, thereby increasing out-of-orderness. In each A-node, a critical value may be determined as a value that is obtained by adding critical values of input lines and "1" one another. A critical value of each A-node is transferred to an output line.

For example, because critical values of input lines of a first A-node A1 is "0", a critical value of the first A-node A1 may be "1". But, a critical value of each A-node may be determined to have a minimum value MV. The minimum value MV may be determined to improve operating performance of a first interconnect 150a and a second interconnect 160a considering latencies and bottlenecks of the first and second interconnect 150a and 160a. For example, the minimum value MV may be a value more than "2". In exemplary embodiments, it is assumed that the minimum value MV is "2". However, the exemplary embodiments are not limited thereto. A critical value of the first A-node A1 calculated is "1', but it is determined that "2" is the minimum value MV. In FIG. 8, numbers in parenthesis mean critical values to which the minimum value MV is not reflected, and numbers outside of brackets mean critical values to which the minimum value MV is reflected.

Critical values of input lines of a second A-node A2 are "0". Thus, a critical value of the second A-node A2 is "2" being the minimum value MV.

In each D-node, an AW request received via an input line is transferred to one of a plurality of output lines. In each D-node, orders of AW requests and W requests are not exchanged. That is, in each D mode, out-of-orderness does not increase or decrease. Thus, in each D-node, a critical value of an input line is transferred to output lines.

A first D-node D1 transfers a critical value of "0" output from a fifth master node M5 without modification.

A second D-node D2 transfers a critical value of "2" output from a first A-node A1 without modification.

A third D-node D3 transfers a critical value of "2" output from a second A-node A2 without modification.

In a third A-node A3, a critical value of a line connected to the second D-node D2 is "2", and a critical value of a line connected to the third D-node D3 is "2". Thus, a critical value of the third A-node A3 determined is "5".

In a fourth A-node A4, a critical value of a line connected to the third A-node A3 is "5", and a critical value of a line connected to the first D-node D1 is "0". Thus, a critical value of the fourth A-node A4 determined is "5".

In a fifth A-node A5, a critical value of a line connected to the second D-node D2 is "2", and a critical value of a line connected to the third D-node D3 is "2". Thus, a critical value of the fifth A-node A5 is "5".

A critical value of each slave node may correspond to a sum of a critical value of an input line and "1". A critical value of an input line of a first slave node S1 is "5". Thus, a critical value of the first slave node S1 is "6". A critical value of an input line of a second slave node S2 is "5". Thus, a critical value of the second slave node S2 is "6".

A queue Q of each A-node of a second interconnect 160a is configured to store AW requests in which the number is greater than or equal to a corresponding critical value. The queue Q of each of the first A-nodes A1 of the second interconnect 160a is configured to store two or more AW requests.

The queue Q of each of the second A-nodes A2 of the second interconnect 160a is configured to store two or more AW requests. The queue Q of each of the third A-nodes A3 of the second interconnect 160a is configured to store five or more AW requests. The queue Q of each of the fourth A-nodes A4 of the second interconnect 160a is configured to store five or more AW requests. The queue Q of each of the fifth A-nodes A5 of the second interconnect 160a is configured to store five or more AW requests.

A rearrangement buffer B of each of slave nodes of the first interconnect 150a is configured to store AW requests in which the number is equal to or greater than a critical value. A rearrangement buffer B of the first slave node S1 of the first interconnect 150a is configured to store six or more AW requests. A rearrangement buffer B of the second slave node S2 of the first interconnect 150a is configured to store six or more AW requests.

The first to fifth master nodes M1 to M5 and the first to third D-nodes D1 to D3 may operate regardless of out-of-orderness. For example, each of the first to fifth master nodes M1 to M5 and the first to third D-nodes D1 to D3 may transfer a request (e.g., AW request or W request) regardless of a state where it does not transmit a request (e.g., AW request or W request). For example, each master node or each D-node may inform that it transfers a request by activating AREADY or WREADY.

The first to fifth A-nodes A1 to A5 may operate considering out-of-orderness. For example, if the out-of-order count reaches a critical value, each of the first to fifth A-nodes A1 to A5 of the first interconnect 150a may not transfer an AW request although it can transfer an AW request. For example, each A-node may informs that it does not receive an AW request, by inactivating AREADY. For example, if an AW request is not first transmitted, each of the first to fifth A-nodes A1 to A5 of the second interconnect 160a may not transfer a W request although it can transfer a W request. For example, each A-node may inform that it does not receive a W request, by inactivating WREADY.

The first and second slave nodes S1 and S2 may operate considering out-of-orderness. For example, if the out-of-order count reaches a critical value, each of the first and second slave nodes S1 and S2 of the first interconnect 150a may not transfer an AW request although it can transfer an AW request. For example, each slave node may inform that it does not receive an AW request, by inactivating AREADY. For example, if an AW request is not first transmitted based on out-of-orderness, each of the first and second slave nodes S1 and S2 of the second interconnect 160a may not transfer a W request although it can transfer a W request. For example, each slave node may inform that it does not receive a W request, by inactivating WREADY.

Figure 9:
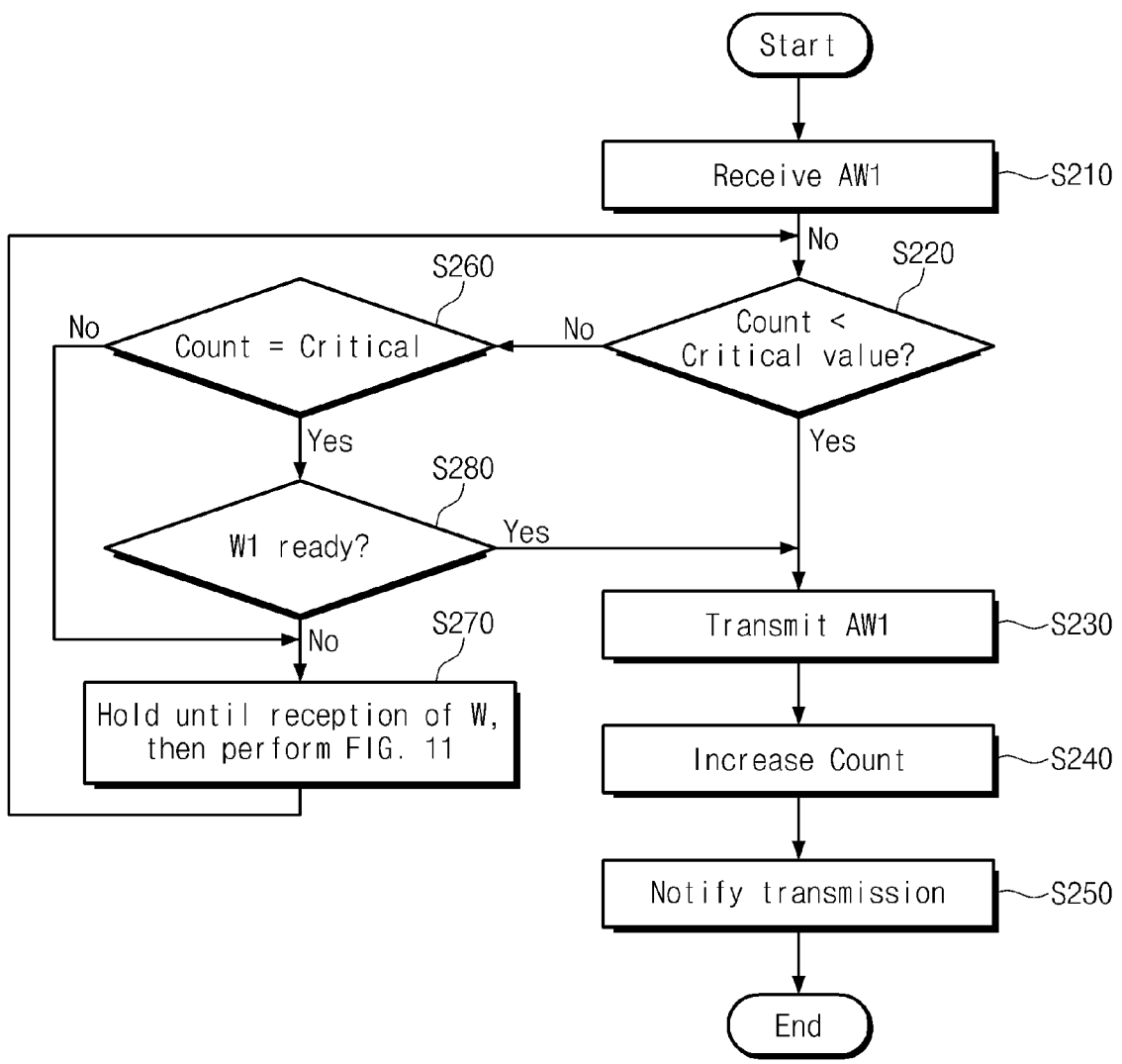
FIG. 9 is a flow chart schematically illustrating an operating method of an A-node of a first interconnect according to an embodiment.

FIG. 9 is a flow chart schematically illustrating an operating method of an A-node of a first interconnect 150a according to an exemplary embodiment. An operating method of an A-node with reference to a third A-node A3 will now be described. Referring to FIGS. 8 and 9, in step S210, a first AW request AW1 is received.

In step S220, whether an out-of-order count is smaller than a critical value is determined. If the out-of-order count is smaller than the critical value, in step S230, the first AW request AW1 is transferred to a next-stage node. The first AW request AW1 may be transmitted regardless of whether a first W request W1 corresponding to the first AW request AW1 is received. The first AW request AW1 may be transmitted regardless of an order of the first W request W1. In step S240, as the first AW request AW1 is transferred, a third A-node A3 increases the out-of-order count. The out-of-order count may increase by "1". In step S250, information indicating that the first AW request AW1 is sent is provided to the third A-node A3 of a second interconnect 160a as transaction information TI. For example, the third A-node of a first interconnect 150a transmits ARPATH, including the first AW request AW1, to the third A-node A3 of the second interconnect 160a. Information of the first AW request AW1 is stored in a queue Q of the second interconnect 160a.

If the out-of-order count is not smaller than the critical value, in step S260, whether the out-of-order count is equal to the critical value is determined. If the out-of-order count is not equal to the critical value, that is, if the out-of-order count is greater than the critical value, in step S270, the third A-node A3 is set to a hold state until a W request is received. For example, the third A-node A3 does not transmit the first AW request AW1 received to a next-stage node and waits. If the W request is received, an operation of FIG. 11 may be performed. Afterwards, the method proceeds to step S220.

If the out-of-order count is equal the critical value, in step S280, whether the first W request W1 which corresponds to the first AW request AW1 received is at a ready state is determined. For example, whether the first W request W1 reaches the third A-node A3 of the second interconnect 160a is determined. If a first request W1 is not at a ready state, the method proceeds to step S270. If the first request W1 is at a ready state, the method proceeds to step S230. For example, if exception about a critical value occurs, that is, if a pair of a first AW request AW1 and a first W request W1 reach the first interconnect 150a and a third A-node A3 of the second interconnect 160a, the first AW request AW1 and the first W request W1 may be sent to a next-stage node although the out-of-order count reaches a critical value.

Figure 10:
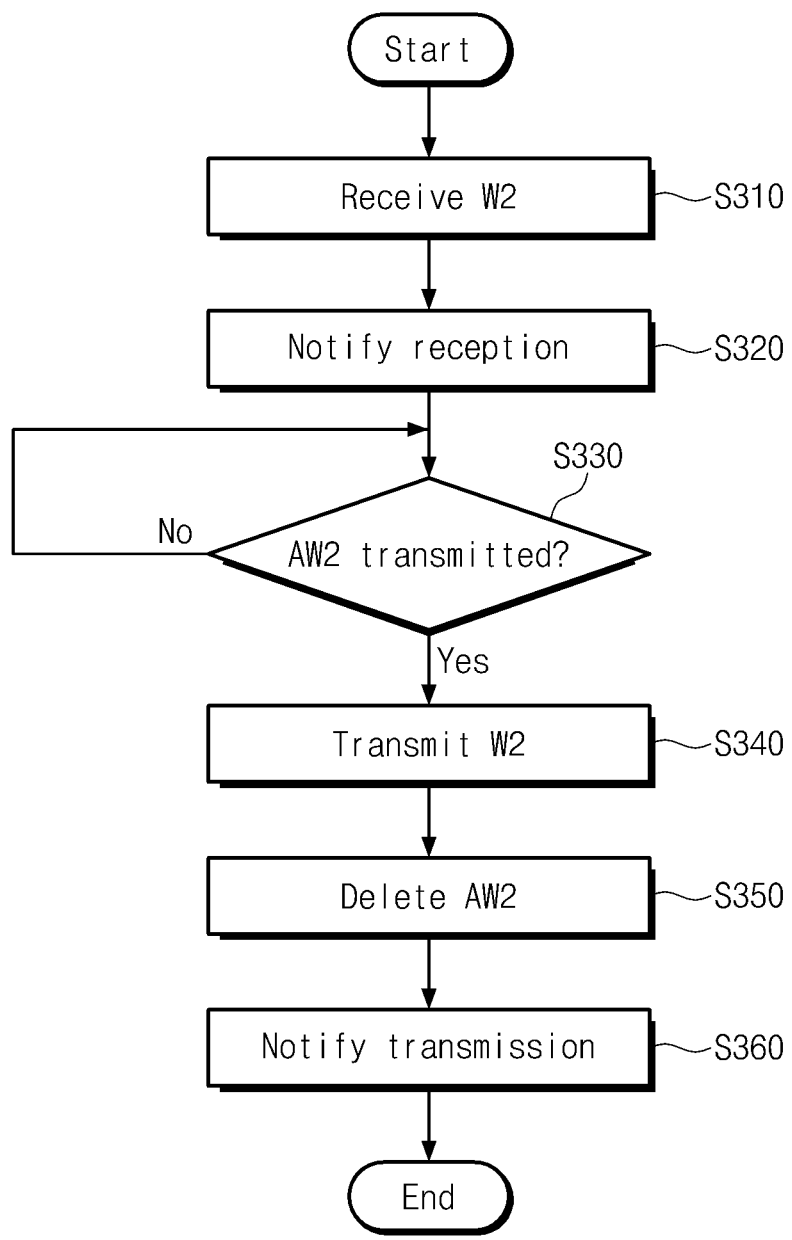
FIG. 10 is a flow chart schematically illustrating an operating method of an A-node of a second interconnect according to an embodiment.

FIG. 10 is a flow chart schematically illustrating an operating method of an A-node of a second interconnect 160a according to an exemplary embodiment. An operating method of an A-node with reference to a third A-node A3 will now be described. Referring to FIGS. 8 and 10, in step S310, a second W request W2 is received.

In step S320, a third A-node A3 notifies that the second W request W2 is received, to a third A-node A3 of a first interconnect 150a. For example, when receiving a first burst transfer of a first W request W1, the third A-node may send WFIRST to the third A-node A3 of the first interconnect 150a as transaction information TI.

In step S330, the third A-node A3 determines whether a second AW request AW2 which corresponds to the second W request W2 is transmitted. For example, the third A-node A3 determines whether information about the second AW request AW2 is stored in a queue Q. The third A-node A3 determines whether ARPATH of the second AW request AW2 is stored in the queue Q. In the event that the second AW request AW2 is not transferred, the third A-node A3 waits until the second AW request AW2 is transmitted. The method proceeds to step S340 when the second AW request AW2 is transmitted.

In step S340, the third A-node A3 provides the second W request W2 to a next-stage node.

In step S350, the third A-node A3 deletes information of the second AW request AW2 stored in the queue Q. For example, the third A-node A3 deletes ARPATH of the second AW request AW2 stored in the queue Q. The third A-node A3 deletes information of the second AW request AW2 when a first burst transfer of the second W request W2 passes.

In step S360, the third A-node A3 notifies that the second W request W2 is transmitted, to a third A-node A3 of the first interconnect 150a. For example, if a first burst transfer of the second W request W2 passes, the third A-node A3 notifies, as transaction information TI, that the second W request W2 is transmitted, to the third A-node A3 of the first interconnect 150a.

Figure 11:
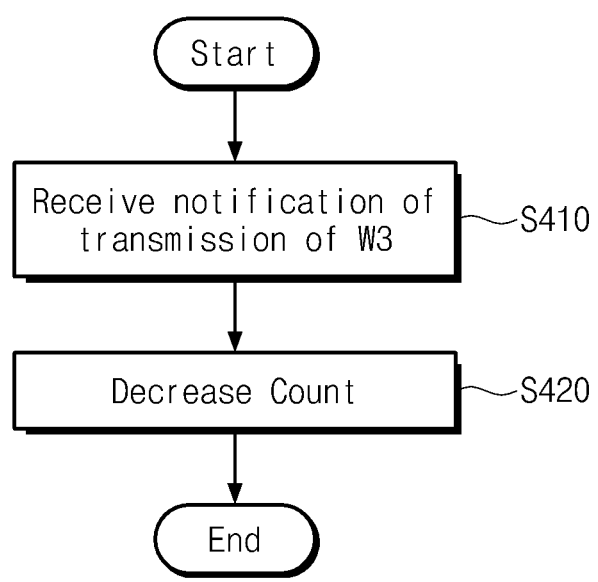
FIG. 11 is a flow chart schematically illustrating an operating method of an A-node of a first interconnect according to another embodiment.

FIG. 11 is a flow chart schematically illustrating an operating method of an A-node of a first interconnect 150a according to another exemplary embodiment. An operating method of an A-node with reference to a third A-node A3 will now be described. Referring to FIGS. 8 and 11, in step S410, there is received notification indicating that a third W request W3 is received. For example, a third A-node A3 receives, as transaction information TI, a message notifying that a first burst transfer of the third W request W3 passes.

In step S420, as recognizing that the third W request W3 is transmitted, the third A-node A3 decrease an out-of-order count.

As described with reference to FIGS. 9 to 11, an A-node of a first interconnect 150a passes received AW requests until an out-of-order count reaches a critical value. The out-of-order count increases whenever AW requests are passed. The out-of-order count decreases when a W request corresponding to AW requests, which have been passed previously, passes through an A-node of a second interconnect 160a. If the out-of-order count reaches a critical value, the AW request is not passed any more. That is, since a mismatch AW request is passed as many as the number corresponding to the critical value, out-of-orderness is allowed at each A-node as many as the number corresponding to the critical value.

In an exception about the out-of-orderness, the event that an AW request and a W request are received together may occur. In this case, although the out-of-order count reaches the critical value, the AW request and the W request may be passed. In either case, the AW request is not passed if the out-of-order count is greater than the critical value.

Figure 12:
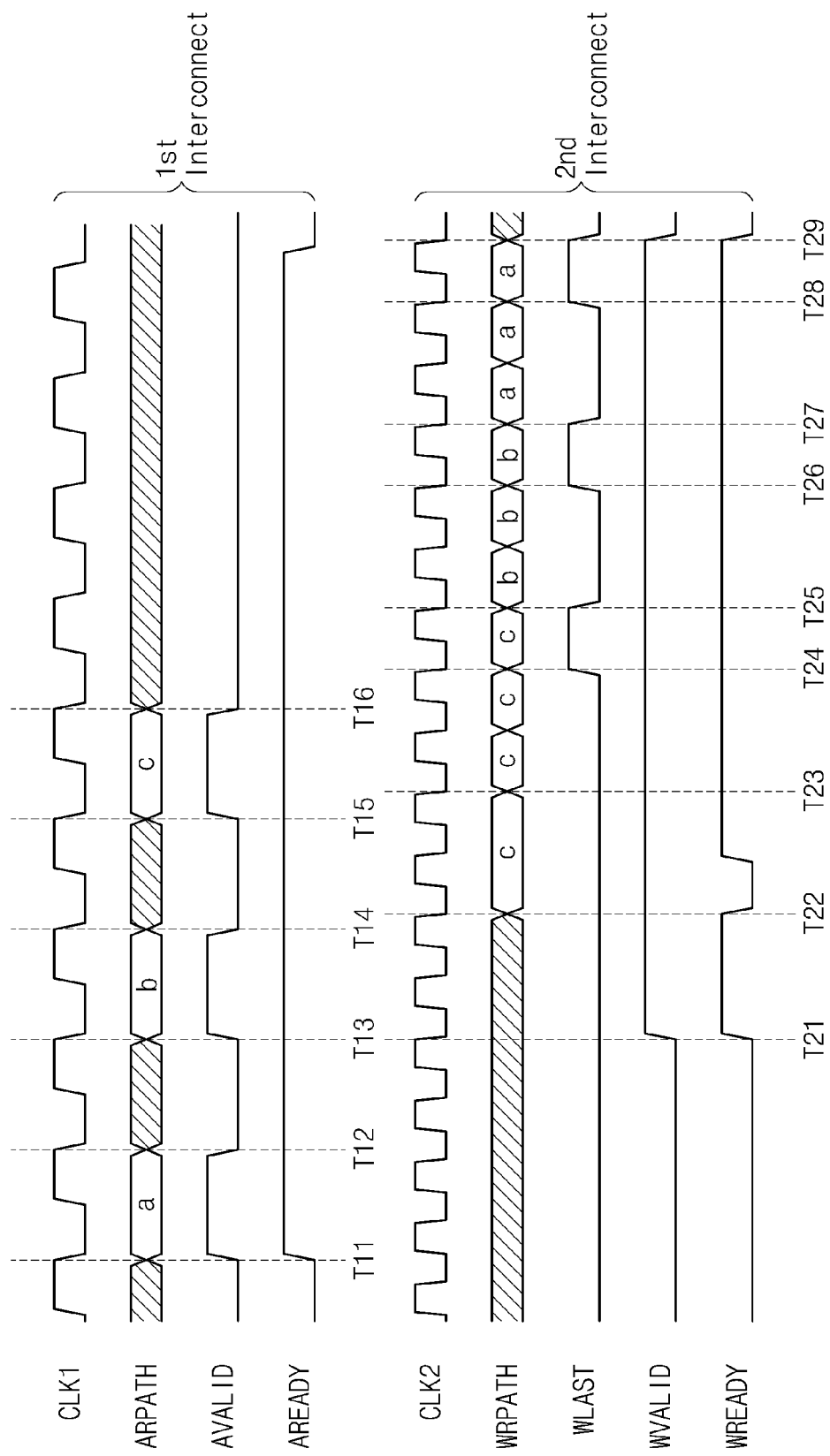
FIG. 12 is a timing diagram for describing an embodiment in which out-of-orderness is managed.

FIG. 12 is a timing diagram for describing an exemplary embodiment in which out-of-orderness is managed. A timing diagram of FIG. 12 with reference to third A-nodes A3 of a first interconnect 150a and a second interconnect 160a will be described.

Referring to FIGS. 8 and 12, AVALID of the first interconnect 150a is activated between T11 and T12. For example, a front-stage node, a second D-node D2 is ready to transfer an AW request. AREADY is activated. A third A-node A3 is ready to receive the AW request. Thus, the second D-node D2 may transmit an AW request, including ARPATH with an identifier of "a", to the third A-node A3. The third A-node A3 provides the received AW request to a next-stage node, a fourth A-node A4. Out-of-orderness (e.g., out-of-order count) increases because a W request with an identifier of "a" is not received.

AVALID of the first interconnect 150a is activated between T13 and T14. For example, a front-stage node, a third D-node D3 is ready to transfer an AW request. AREADY is activated. The third A-node A3 is ready to receive the AW request. Thus, the third D-node D3 may transmit an AW request, including ARPATH with an identifier of "b", to the third A-node A3. The third A-node A3 provides the received AW request to a next-stage node, the fourth A-node A4. Out-of-orderness increases because a W request with an identifier of "b" is not received.

AVALID of the second interconnect 160a is activated between T21 and T22. For example, a front-stage node, the second D-node D2 is ready to transfer an AW request. AREADY is activated. The third A-node A3 is ready to receive the AW request.

Between T22 and T23, the second D-node D2 may transmit a W request, including WRPATH with an identifier of "c", to the third A-node A3. Since an AW request with an identifier of "c" is not still passed, a W request with an identifier of "c" does not pass the third A-node A3.

Between T15 and T16, a front-stage node, the second D-node D2 is ready to transfer an AW request. AREADY is activated. The third A-node A3 is ready to receive the AW request. Thus, the second D-node D2 may transmit an AW request, including ARPATH with an identifier of "b", to the third A-node A3. The third A-node A3 provides the received AW request to a next-stage node, the fourth A-node A4.

In the first interconnect 150a, an AW request with an identifier of "c" is passed. Therefore, in the second interconnect 160a, a W request with an identifier of "c" is passed.

WLAST of the second interconnect 160a is activated between T24 and T25. That is, the last burst transfer having an identifier of "c" passes the third A-node A3.

Between T25 and T26, a W request with an identifier of "b" is transmitted from a front-stage node of the second interconnect 160a, for example, the third D-node D3. Since an AW request with an identifier of "b" is already passed, a W request with an identifier of "b" passes the third A-node A3. As a first burst transfer of the W request passes the third A-node A3, out-of-orderness (e.g., out-of-order count) of the third A-node A3 increases.

WLAST of the second interconnect 160a is activated between T26 and T27. That is, the last burst transfer having an identifier of "b" passes the third A-node A3.

Between T27 and T28, a W request with an identifier of "a" is transmitted from a front-stage node of the second interconnect 160a, for example, the second D-node D2. Since an AW request with an identifier of "a" is already passed, a W request with an identifier of "a" passes the third A-node A3. As a first burst transfer of the W request passes the third A-node A3, out-of-orderness (e.g., out-of-order count) of the third A-node A3 decreases.

WLAST of the second interconnect 160a is activated between T28 and T29. That is, the last burst transfer having an identifier of "a" passes the third A-node A3.

In FIG. 12, after the out-of-order count increases twice, it decreases twice.

Figure 13:
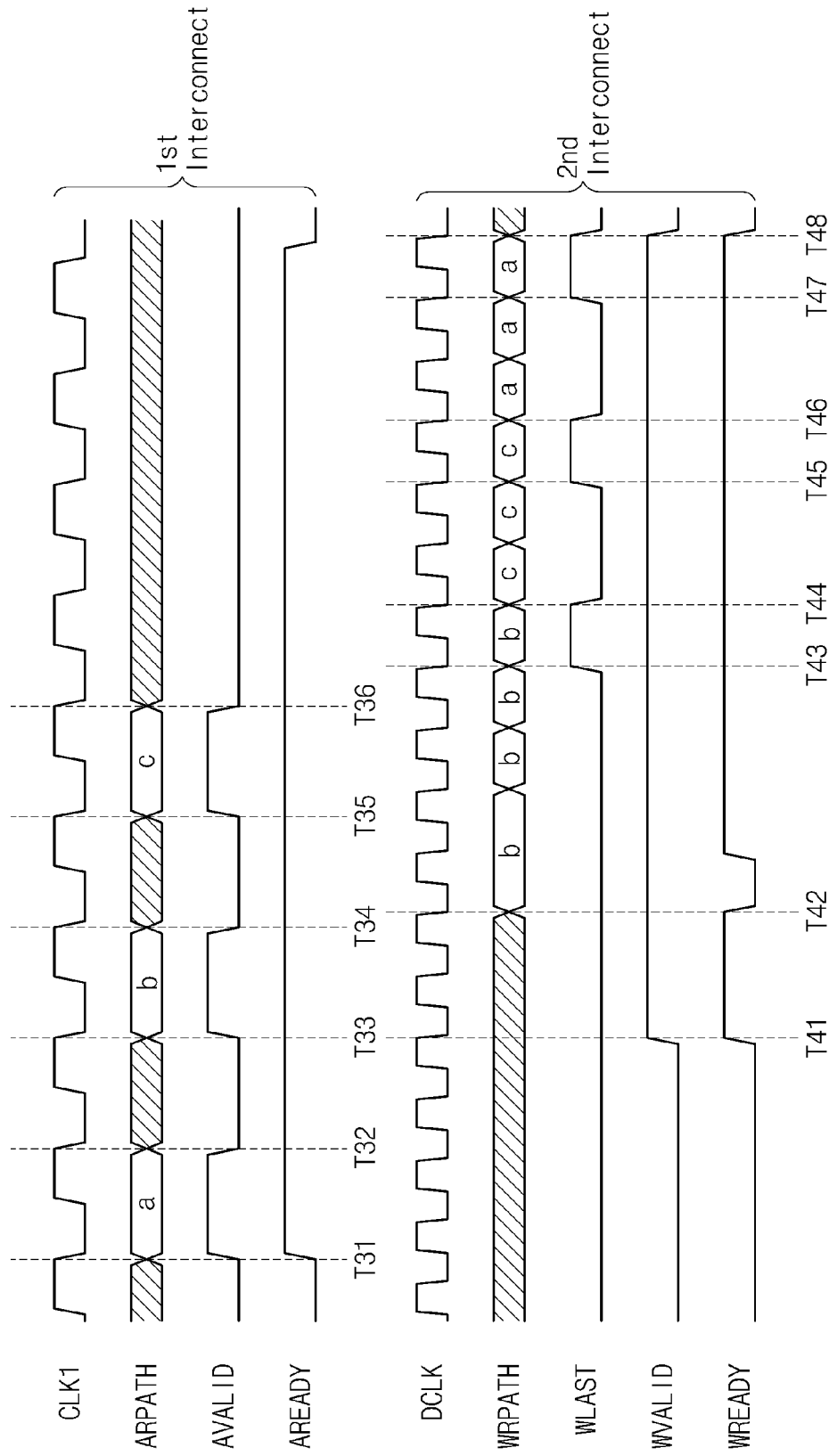
FIG. 13 is a timing diagram for describing another embodiment in which out-of-orderness is managed.

FIG. 13 is a timing diagram for describing another exemplary embodiment in which out-of-orderness is managed. A timing diagram of FIG. 13 with reference to third A-nodes A3 of a first interconnect 150a and a second interconnect 160a will now be described.

Referring to FIGS. 8 and 13, AVALID of the first interconnect 150a is activated between T31 and T32. For example, a front-stage node, a second D-node D2 is ready to transfer an AW request. AREADY is activated. A third A-node A3 is ready to receive the AW request. Thus, the second D-node D2 may transmit an AW request, including ARPATH with an identifier of "a", to the third A-node A3. The third A-node A3 provides the received AW request to a next-stage node, a fourth A-node A4. Since a W request with an identifier of "a" is not received, out-of-orderness (e.g., out-of-order count) increases.

AVALID of the first interconnect 150a is activated between T33 and T34. For example, a front-stage node, a third D-node D3 is ready to transfer an AW request. AREADY is activated. The third A-node A3 is ready to receive the AW request. Thus, the third D-node D3 may transmit an AW request, including ARPATH with an identifier of "b", to the third A-node A3. The third A-node A3 provides the received AW request to a next-stage node, the fourth A-node A4.

AVALID of the second interconnect 160a is activated between T41 and T42. For example, a front-stage node, the second D-node D2 is ready to transfer an AW request. AREADY is activated. The third A-node A3 is ready to receive the AW request.

Between T42 and T43, in the second interconnect 160a, a W request with an identifier of "b" is transmitted from a front-stage node, for example, the third D-node D3. Since an AW request with an identifier of "b" is already passed, a W request with an identifier of "b" passes the third A-node A3.

Between T35 and T36, a front-stage node, the second D-node D2 is ready to transfer an AW request. AREADY is activated. The third A-node A3 is ready to receive the AW request. Thus, the second D-node D2 may transmit an AW request, including ARPATH with an identifier of "a", to the third A-node A3. The third A-node A3 provides the received AW request to a next-stage node, the fourth A-node A4.

WLAST of the second interconnect 160a is activated between T43 and T44. That is, the last burst transfer having an identifier of "b" passes the third A-node A3.

Between T44 and T45, a W request with an identifier of "c" is transmitted from a front-stage node of the second interconnect 160a, for example, the second D-node D2. Since an AW request with an identifier of "c" is already passed, a W request with an identifier of "c" passes the third A-node A3.

WLAST of the second interconnect 160a is activated between T45 and T46. That is, the last burst transfer having an identifier of "c" passes the third A-node A3.

Between T46 and T47, a W request with an identifier of "a" is transmitted from a front-stage node of the second interconnect 160a, for example, the second D-node D2. Since an AW request with an identifier of "a" is already passed, a W request with an identifier of "a" passes the third A-node A3. As a first burst transfer of the W request passes the third A-node A3, out-of-orderness (e.g., out-of-order count) of the third A-node A3 decreases.

WLAST of the second interconnect 160a is activated between T47 and T48. That is, the last burst transfer having an identifier of "a" passes the third A-node A3.

In FIG. 13, after the out-of-order count increases once, it decreases once.

Figure 14:
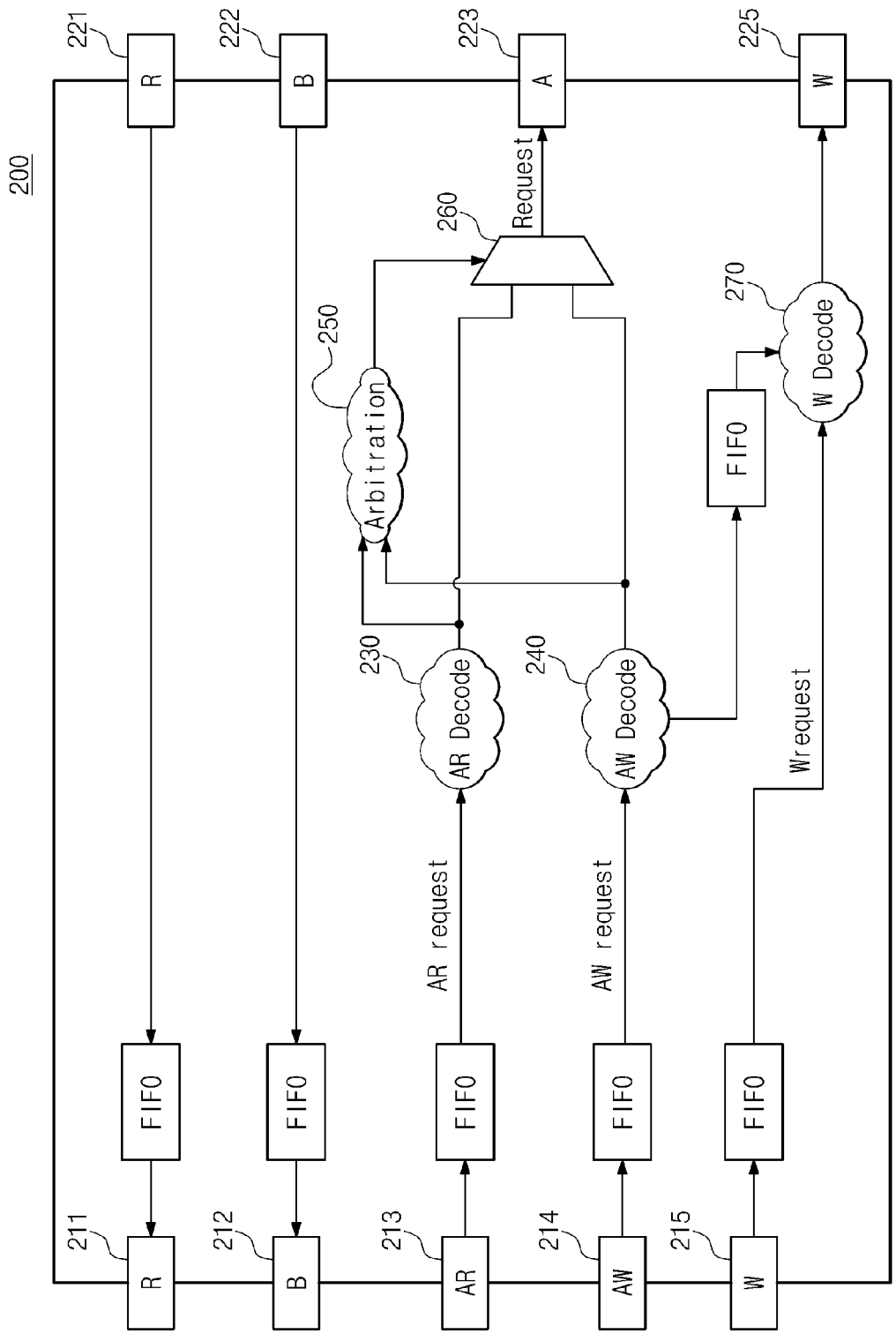
FIG. 14 is a block diagram schematically illustrating a master node according to an embodiment.

FIG. 14 is a block diagram schematically illustrating a master node 200 according to an exemplary embodiment. Referring to FIGS. 8 and 14, a master node 200 includes first ports 211 to 215, second ports 221 to 223 and 225, first-in first-out circuits FIFO, an AR decode unit 230, an AW decode unit 240, an arbitration unit 250, a multiplexer 260, and a W decode unit 270.

The first ports 211 to 215 may be ports connected with a master device. The first ports 211 to 215 may be an AXI slave interface. The first ports 211 to 215 include an R port 211, a B port 212, an AR port 213, an AW port 214, and a W port 215.

The R port 211 outputs read response channel signals to a master device. The B port 212 outputs write response channel signals to the master device. The AR port 213 outputs read address channel signals to the master device. The AW port 214 outputs write address channel signals to the master device. The W port 215 receives write data channel signals from the master device.

The second ports 221 to 223 and 225 may be connected to lower nodes in a first interconnect 150a and a second interconnect 160a. The second ports 221 to 223 and 225 may be an AXI-based master interface. The second ports 221 to 223 and 225 include an R port 221, a B port 222, an A port 223, and a W port 225.

The R port 221 receives read response channel signals to a lower node. The B port 222 receives write response channel signals to the lower node. The A port 223 outputs serialized address channel signals to the lower node. The W port 225 outputs write address channel signals to the lower node.

The first-in first-out circuits FIFO may include asynchronous first-in first-out circuits. The first-in first-out circuits FIFO may act as a clock bridge among different clock domains. In the event that a frequency of a clock used at an input stage of each first-in first-out circuit is the same as a frequency of a clock used at an output stage of each first-in first-out circuit, each first-in first-out circuit may include a synchronous first-in first-out circuit.

The AR decode unit 230 decodes a read address, that is, ARADDR. The AR decode unit 230 generates ADPATH indicating a path through which an AR request is transferred, as a result of decoding.

The AW decode unit 240 decodes a write address, that is, AWADDR. The AW decode unit 240 generates ADPATH indicating a path through which an AW request is transferred, as a result of decoding.

The arbitration unit 250 selects and outputs one of the AR request being an output of the AR decode unit 230 and the AW request being an output of the AW decode unit 240. The multiplexer 260 transfers an output of the arbitration unit 250 to the A port 223. The arbitration unit 250 may determine priorities of AR and AW requests according to a predetermined policy. The arbitration unit 250 selects one of AR and AW requests according to a determined priority. For example, in the event that one of the AR request and the AW request exists, the arbitration unit 250 may select an existing request. If both the AR request and the AW request exist, the arbitration unit 250 first selects the AR request.

The W decode unit 270 receives ADPATH from the AW decode unit 240. The W decode unit 270 outputs ADPATH as WDPATH to a lower node together with the W request.

In exemplary embodiments, the master node 200 performs translation between an AXI interface of a master device and modified AXI interfaces of first and second interconnects 150a and 160a. For example, the AXI interface has an AR channel and an AW channel independently, but the modified AXI interface has a unified A channel. However, the exemplary embodiments are not limited thereto.

Figure 15:
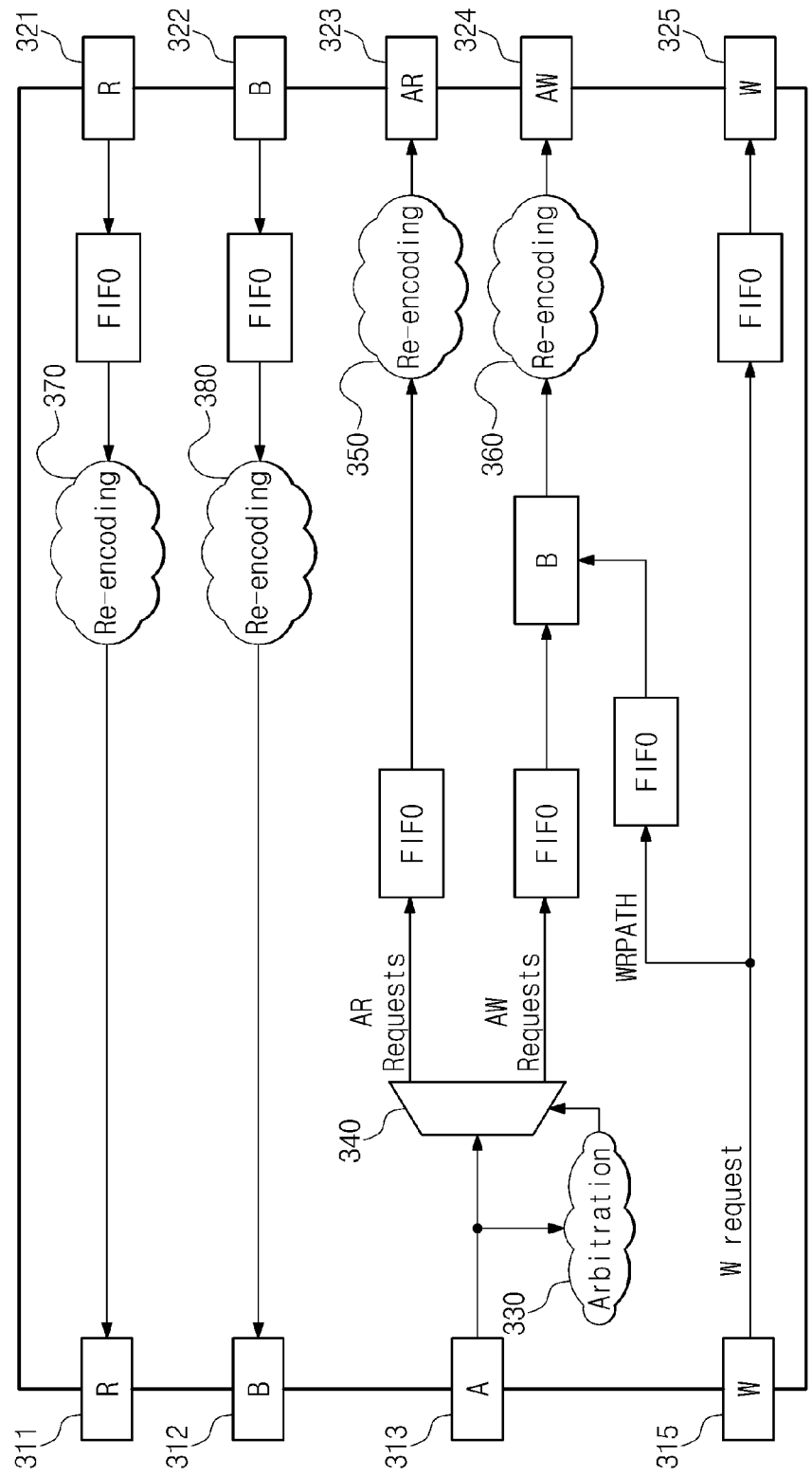
FIG. 15 is a block diagram schematically illustrating a slave node according to an embodiment.

FIG. 15 is a block diagram schematically illustrating a slave node 300 according to an exemplary embodiment. Referring to FIG. 15, a slave node 300 includes first ports 311 to 313 and 315, second ports 321 to 325, first-in first-out circuits FIFO, a rearrangement buffer B, an arbitration unit 330, a de-multiplexer 340, and re-encoding units 350 to 380.

The first ports 311 to 313 and 315 may be connected to upper nodes in a first interconnect 150a and a second interconnect 160a. The first ports 311 to 313 and 315 may be an AXI-based slave interface. The first ports 311 to 313 and 315 include an R port 311, a B port 312, an A port 313, and a W port 315.

The R port 311 sends read response channel signals to an upper node. The B port 312 sends write response channel signals to the upper node. The A port 313 receives serialized address channel signals from the upper node. The W port 315 receives write address channel signals from the upper node.

The second ports 321 to 325 may be ports connected with a slave device. The second ports 321 to 325 may be an AXI master interface. The second ports 321 to 325 include an R port 321, a B port 322, an AR port 323, an AW port 324, and a W port 325.

The R port 321 outputs read response channel signals to a master device. The B port 322 outputs write response channel signals to the master device. The AR port 323 receives read address channel signals from the master device. The AW port 324 receives write address channel signals from the master device. The W port 325 receives write data channel signals from the master device.

The first-in first-out circuits FIFO may include asynchronous first-in first-out circuits. The first-in first-out circuits FIFO may act as a clock bridge among different clock domains. In the event that a frequency of a clock used at an input stage of each first-in first-out circuit is the same as a frequency of a clock used at an output stage of each first-in first-out circuit, each first-in first-out circuit may include a synchronous first-in first-out circuit.

The arbitration unit 330 determines whether a request received via the A port 313 is an AR request or an AW request. The arbitration unit 330 controls the de-multiplexer 340 according to the determining result. The de-multiplexer 340 outputs an AR request to the re-encoding unit 350 according to a control of the arbitration unit 330. The de-multiplexer 340 outputs an AW request to the rearrangement buffer B according to a control of the arbitration unit 330.

The rearrangement buffer B is configured to store AW requests. The rearrangement buffer B is configured to receive WRPATH of a W request received via the W port 315. The rearrangement buffer B compares ARPATH of stored AW requests and the received WRPATH. The rearrangement buffer B detects AW requests having ARPATH that has the same source node as a source node indicated by WRPATH. The rearrangement buffer B outputs the oldest AW request of the detected AW requests to the re-encoding unit 360.

In exemplary embodiments, AW requests transferred from the same source node may be transferred to slave nodes via the same nodes (A-nodes and D-nodes). Thus, an order of AW requests with the same source node is fixed, not mixed. That is, the oldest AW request may be an AW request having the earliest order. Thus, the oldest AW request is determined to be paired with a W request. Therefore, it is sent to a slave device.

If sent to the re-encoding unit 360, the AW request is deleted from the rearrangement buffer B.

The re-encoding unit 350 encodes the AR request transferred from the A port 313 to transfer it to the AR port 323. The re-encoding unit 360 encodes the AW request transferred from the rearrangement buffer B to transfer it to the AW port 324. The re-encoding unit 370 encodes a signal from the R port 321 to send it to the R port 311. The re-encoding unit 380 encodes a signal from the B port 322 to provide it to the B port 312.

In exemplary embodiments, the slave node 300 performs translation between an AXI interface of a slave device and modified AXI interfaces of first and second interconnects 150a and 160a. For example, the AXI interface has an AR channel and an AW channel independently, but the modified AXI interface has a unified A channel. However, the inventive concept is not limited thereto.

Figure 16:
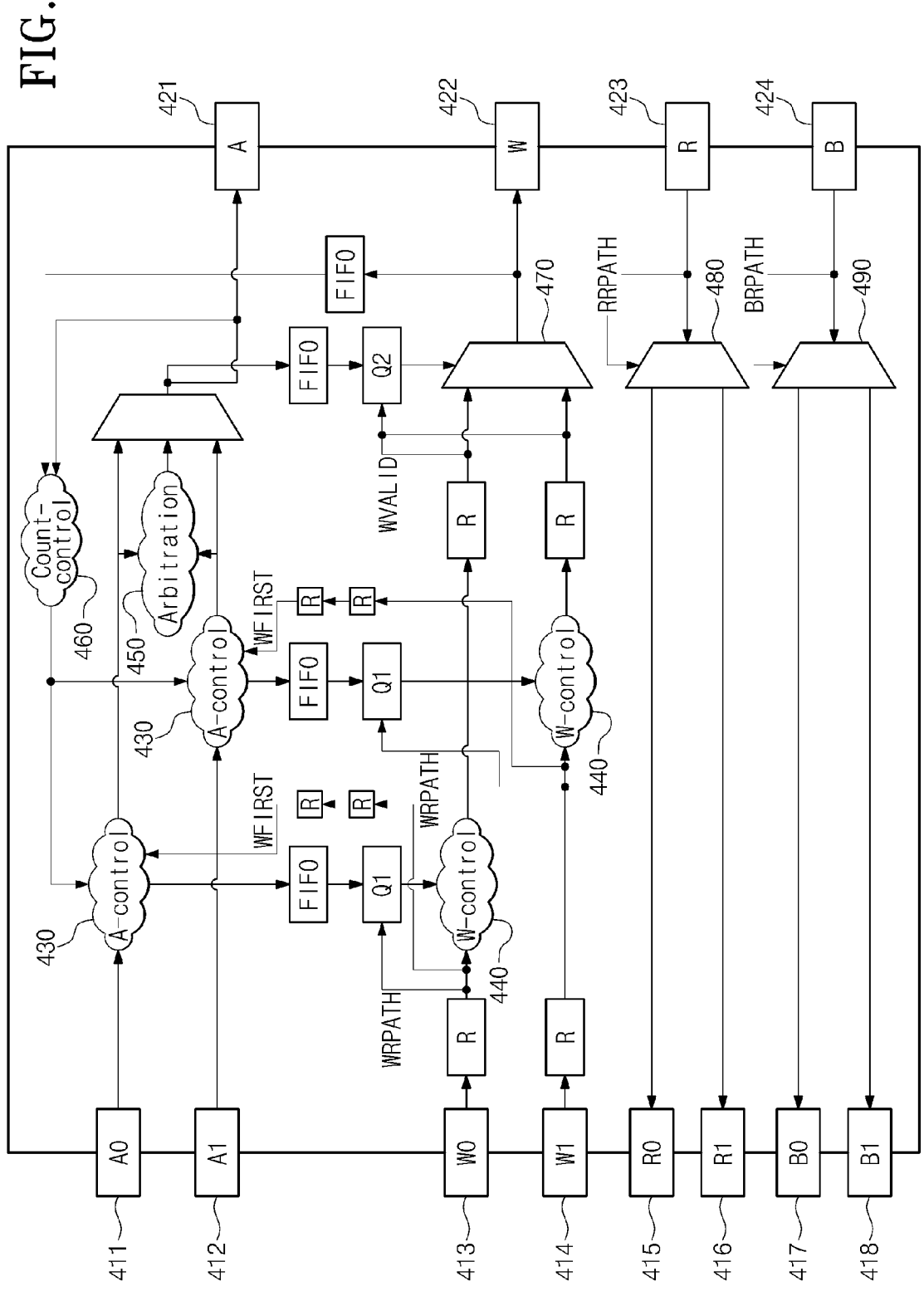
FIG. 16 is a block diagram schematically illustrating an A-node according to an embodiment.

FIG. 16 is a block diagram schematically illustrating an A-node 400 according to an exemplary embodiment. Referring to FIG. 16, an A-node 400 includes first ports 411 to 418, second ports 421 to 424, registers R, first-in first-out circuits FIFO, queues Q1 and Q2, A control units 430, W control units 440, an arbitration unit 450, a count control unit 460, a multiplexer 470, and de-multiplexers 480 and 490.

The A-node 400 transfers a signal (e.g., AW request or AR request) of one of A0 and A1 ports 411 and 412 to the A port 421. The A-node 400 transfers a signal (e.g., W request) of one of W0 and W1 ports 413 and 414 to the W port 422. The A-node 400 transfers a signal received via the R port 423 to one of R0 and R1 ports 415 and 416. The A-node 400 transfers a signal received via the B port 424 to one of B0 and B1 ports 417 and 418.

The registers R store W requests (or, some signals of W requests) transferred into the A-node 400. The registers R may store W requests in a pipeline manner. The registers R provides the A-node 400 with a pipeline function.

The first-in first-out circuits FIFO may include asynchronous first-in first-out circuits. The first-in first-out circuits FIFO may act as a clock bridge among different clock domains. In the event that a frequency of a clock used at an input stage of each first-in first-out circuit is the same as a frequency of a clock used at an output stage of each first-in first-out circuit, each first-in first-out circuit may include a synchronous first-in first-out circuit.

The queues Q1 store ARPATH, searches a specific one of the stored ARPATHs, and deletes selected ARPATHs of the stored ARPATHs.

The A control units 430 receive AR requests or AW requests from the A0 and A1 ports 411 and 412. The A control units 430 pass AR request without limitation. The A control units 430 pass AW requests when an out-of-order count is smaller than a critical value.

In the event that the out-of-order count reaches a critical value, the A control units 430 pass AW requests only when WFIRST is activated. For example, if a source node of WRPATH included in WFIRST coincides with a source node of ARPATH, the A control units 430 pass AW requests although the out-of-order count reaches a critical value. In exemplary embodiments, to guarantee a waiting situation occurring when a W request arrives prior to an AW request, WFIRST including WRPATH may have a predetermined delay (e.g., pipelines).

When the out-of-order count is greater than a critical value, the A control units 430 may not pass AW requests but block the AW requests. When AW requests are passed, the A control units 430 provides the queues Q1 with ARPATH of the passed AW requests.

The queues Q1 store ARPATH from the A control units 440. When a W request is received, the queues Q1 receive WRPATH of the W request. The queues Q1 determine whether ARPATH with the same source node as the received WRPATH exists. If ARPATH with the same source node as the received WRPATH exists, an AW request corresponding to the W request is determined already to pass the A-node 400. Afterwards, the AW request is deleted from the queues Q1.

The W control units 440 receive W requests from the W0 and W1 ports 413 and 414. The W control units 440 receive from the queues Q1 information about whether AW requests corresponding to received W requests already pass the A-node 400. The W control units 440 pass the received W requests if AW requests are already passed.

The arbitration unit 450 performs arbitration based on a least recently used (LRU) manner. The arbitration unit 250 grants a priority to a specific input port of a plurality of input ports by setting QURGENT to "1".

Information of a source port of an AW request is inserted in the queue Q2 when the AW request passes the A-node 400. The multiplexer 470 operates based on information of a source port stored in the queue Q2. The queue Q2 outputs information of a source port when a W request to be transmitted exists, that is, in response to WVALID. After arbitration is completed, the arbitration unit 450 adds information of a source port in ARPATH and WRPATH.

The count control unit 460 manages an out-of-order count and controls the A control units 430 according to the out-of-order count. The count control unit 460 increases the out-of-order count when an AW request is passed and decreases the out-of-order count when a W request is passed. The count control unit 460 provides the out-of-order count to the A control units 430.

The A control units 430, arbitration unit 450, and count control unit 460 may operate in a single clock cycle.

A FIFO latency between an output of the multiplexer 470 and the count control unit 460 may be set to be longer than a latency occurring when WFIRST is sent to the A control units 430.

The de-multiplexer 480 transfers a signal of the R port 423 to the R0 port 415 or the R1 port 416 based on LSB of RRPATH. The de-multiplexer 490 transfers a signal of the B port 424 to the B0 port 417 or the B1 port 418 based on LSB of BRPATH.

Figure 17:
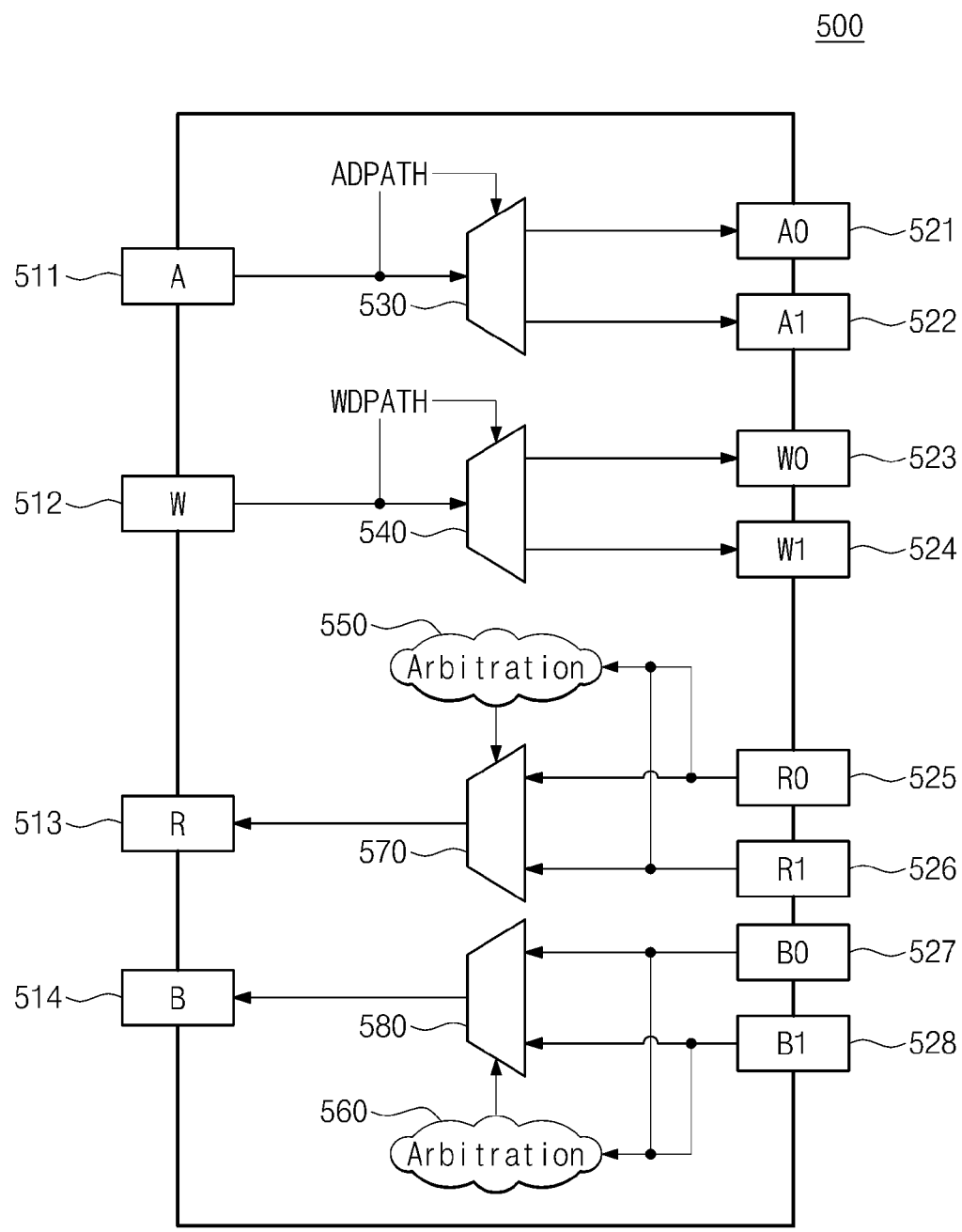
FIG. 17 is a block diagram schematically illustrating a D-node according to an embodiment.

FIG. 17 is a block diagram schematically illustrating a D-node 500 according to an exemplary embodiment. Referring to FIG. 17, a D-node 500 includes first ports S11 to S14, second ports 521 to 528, de-multiplexers 530 and 540, arbitration units 550 and 560, and multiplexers 570 and 580.

The de-multiplexer 530 transfers a signal of the A port S11 to the A0 port 521 or the A1 port 522 based on MSB of ADPATH.

The de-multiplexer 540 transfers a signal of the W port S12 to the W0 port 523 or the W1 port 524 based on MSB of WDPATH.

The arbitration unit 550 controls the multiplexer 570 according to a predetermined priority rule (e.g., LRU). The multiplexer 570 provides the R port S13 with a signal of the R0 port 525 or the R1 port 526.

The arbitration unit 560 controls the multiplexer 580 according to a predetermined priority rule (e.g., LRU). The multiplexer 580 provides the B port S14 with a signal of the B0 port 527 or the B1 port 528.

With exemplary embodiments, it is possible to minimize communication between first and second interconnects 150a and 160a having different clock domains and to support restricted out-of-orderness. Also, it is possible to support out-of-orderness capable of minimizing the latency, and a queue size is provided to minimize overhead.

Figure 18:
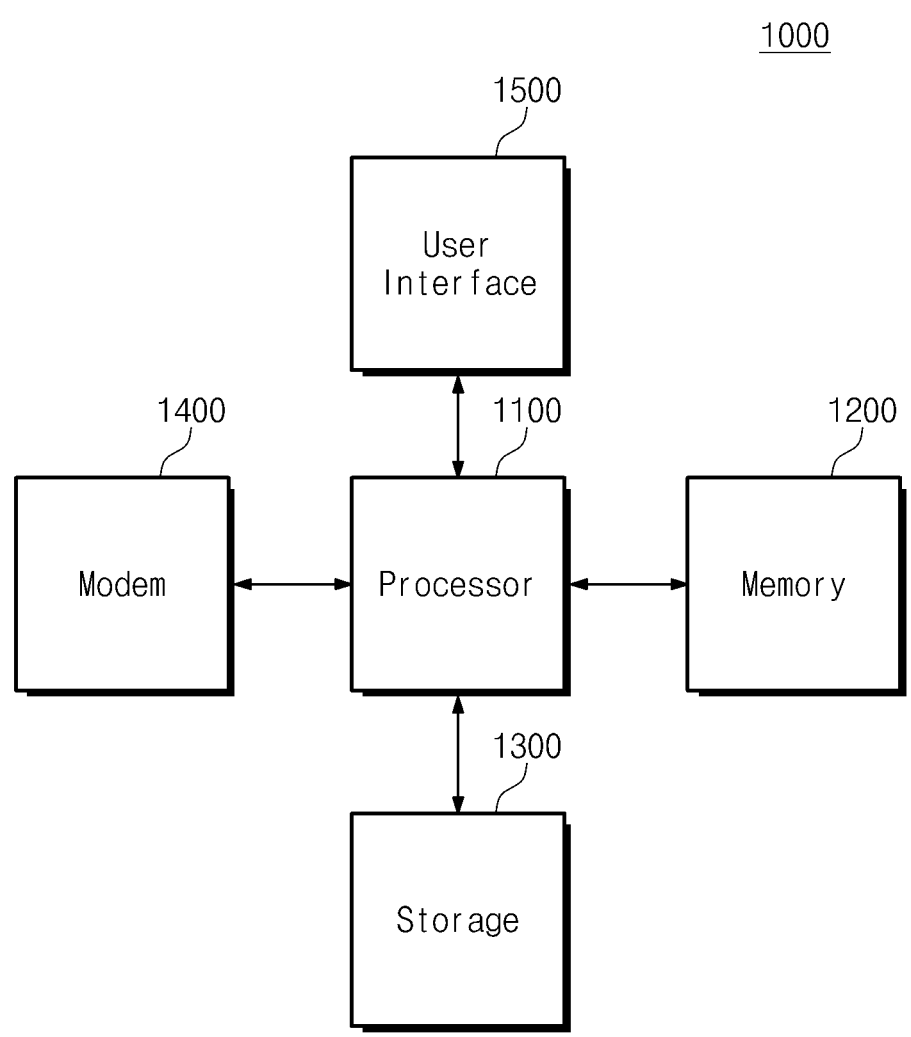
FIG. 18 is a block diagram schematically illustrating a computing device according to an embodiment.

FIG. 18 is a block diagram schematically illustrating a computing device 1000 according to an exemplary embodiment. Referring to FIG. 18, a computing device 1000 includes a processor 1100, a memory 1200, storage 1300, a modem 1400, and a user interface 1500.

The processor 1100 controls an overall operation of the computing device 1000 and may perform a logical operation. The processor 1100 is formed of a system-on-chip (SoC). The processor 1100 may be a general purpose processor used in a personal computer, a specific-purpose processor used in a specific-purpose computer, or an application processor used in a mobile computing device.

The processor 1100 may include a first interconnect 150a (refer to FIG. 8) and a second interconnect 160a according to an embodiment of the inventive concept. An operating speed of the processor 110 is improved via the first and second interconnects 150a and 160a.

The memory 1200 communicates with the processor 1100. The memory 1200 may be a working memory of the processor 1100 or the computing device 1000. The processor 1100 stores codes or data temporarily. The processor 1100 executes codes using the memory 1200 to process data. The processor 1100 executes a variety of software, such as, but not limited to, an operating system and an application, using the memory 1200. The processor 1100 controls an overall operation of the computing device 1000 using the memory 1200. The memory 1200 may include a volatile memory such as, but not limited to, a static RAM, a dynamic RAM, a synchronous DRAM, and so on or a nonvolatile memory such as, but not limited to, a flash memory, a Phase-change RAM (PRAM), a Magnetic RAM (MRAM), a Resistive RAM (RRAM), a Ferroelectric RAM (FRAM), and so on.

The storage 1300 communicates with the processor 1100. The storage 1300 is used to store data for a long time. That is, the processor 1100 stores data for a long time in the storage 1300. The storage 1300 stores a boot image for driving the computing device 1000. The storage 1300 stores source codes of a variety of software, such as an operating system and an application. The storage 1300 stores data that is processed by a variety of software, such as an operating system and an application.

In exemplary embodiments, the processor 1100 drives a variety of software, such as an operating system and an application, by loading source codes stored in the storage 1300 onto the memory 1200 and executing codes loaded onto the memory 1220. The processor 1100 loads source codes stored in the storage 1300 onto the storage 1300 and process data loaded onto the memory 1200. The processor 1100 stores data for a long time of data stored in the memory 1200.

The storage 1300 includes a nonvolatile memory, such as, but not limited to, a flash memory, a Phase-change RAM (PRAM), a Magnetic RAM (MRAM), a Resistive RAM (RRAM), a Ferroelectric RAM (FRAM), and so on.

The modem 1400 communicates with an external device according to a control of the processor 1100. For example, the modem 1400 communicates with the external device in a wire or wireless manner. The modem 1400 may communicate based on at least one of wireless communications manners, such as, but not limited to, Long Term Evolution (LTE), WiMax, Global System for Mobile communication (GSM), Code Division Multiple Access (CDMA), Bluetooth, Near Field Communication (NFC), WiFi, Radio Frequency Identification (RFID), and so on or wire communications manners, such as, but not limited to, Universal Serial Bus (USB), Serial AT Attachment (SATA), Small Computer Small Interface (SCSI), Firewire, Peripheral Component Interconnection (PCI), and so on.

The user interface 1500 communicates with a user according to a control of the processor 1100. For example, the user interface 1500 may include, but not limited to, user input interfaces such as a keyboard, a keypad, a button, a touch panel, a touch screen, a touch pad, a touch ball, a camera, a microphone, a gyroscope sensor, a vibration sensor, and so on. The user interface 1500 may further include, but not limited to, user output interfaces such as an LCD, an Organic Light Emitting Diode (OLED) display device, an Active Matrix OLED (AMOLED) display device, an LED, a speaker, a motor, and so on.

The computing device 1000 may be a mobile computing device, such as, but not limited to, a smart phone, a smart pad, or a smart camera. The computing device 1000 may be a device, such as, but not limited to, a personal computer, a notebook computer, or a smart television.

While the inventive concept has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An operating method of a system interconnect which connects a plurality of master devices and a plurality of slave devices, for transmitting a plurality of control signals from a first device to a second device based on a first clock and a plurality of data signals based on a second clock, the plurality of data signals being associated with the plurality of control signals, respectively, the operating method comprising:

receiving, by a first node of the system interconnect, a control signal, of the plurality of control signals, from one of the plurality of master devices;

transmitting the control signal to a second node of the system interconnect regardless of an order in response to a count value being less than a certain value; and storing the control signal in the first node, in response to the count value being greater than the certain value, wherein, in the system interconnect, the order comprises a first order for transferring the plurality of control signals and a second order for transferring the plurality of data signals, and the system interconnect allows a predetermined range of out-of-orderness between the plurality of control signals and the plurality of data signals while the plurality of control signals and the plurality of data signals being transferred from the first device to the second device, and wherein the count value indicates a number of mismatched control signals which are transferred while corresponding data signals are not transferred.

2. The operating method of claim 1, further comprising: transmitting the control signal, which has been stored, and one of the plurality of data signals regardless of the order in response to the count value being equal to the certain value and a corresponding data signal arriving.

3. The operating method of claim 1, further comprising: storing the control signal in the first node, in response to the count value being equal to the certain value and a corresponding data signal missing.

4. The operating method of claim 2, further comprising: decreasing the count value in response to the corresponding data signal being transmitted.

5. An operating method of an A-node, the operating method comprising:

receiving a first request of the A-node;

determining whether an out of order count is smaller than or equal to a certain value;

transmitting the first request to a next state node in response to the determining that the out of order count is smaller than the certain value;

setting a hold state of the A-node in response to the determining that the out of order count is greater than the certain value and storing the first request in a queue of the A-node;

determining whether the first request is in a ready state in response to the determining that the out of order count is equal to the certain value; and transmitting the first request to the next state node in response to the determining that the first request is in the ready state, or setting the hold state of the A-node and storing the first request in the queue of the A-node in response to the determining that the first request is not in the ready state.

6. The operating method of claim 5, further comprising: increasing the out of order count in response to the transmitting the first request to the next state node.

7. The operating method of claim 6, further comprising: notifying that the first request has been transmitted to the next state node in response to the increasing the out of order count.

* * * * *